(12) United States Patent
Yamamoto et al.

(10) Patent No.: US 10,225,567 B2
(45) Date of Patent: Mar. 5, 2019

(54) IMAGE DECODER, IMAGE ENCODER, AND ENCODED DATA CONVERTER

(71) Applicant: Sharp Kabushiki Kaisha, Osaka-shi, Osaka (JP)

(72) Inventors: Tomoyuki Yamamoto, Osaka (JP); Tomohiro Ikai, Osaka (JP); Takeshi Tsukuba, Oaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 142 days.

(21) Appl. No.: 15/027,455

(22) PCT Filed: Oct. 7, 2014

(86) PCT No.: PCT/JP2014/076853
§ 371 (c)(1),
(2) Date: Apr. 6, 2016

(87) PCT Pub. No.: WO2015/053287
PCT Pub. Date: Apr. 16, 2015

(65) Prior Publication Data
US 2016/0255354 A1 Sep. 1, 2016

(30) Foreign Application Priority Data
Oct. 8, 2013 (JP) .................. 2013-211231

(51) Int. Cl.
*H04N 7/12* (2006.01)
*H04N 11/02* (2006.01)
(Continued)

(52) U.S. Cl.
CPC .......... *H04N 19/33* (2014.11); *H04N 19/103* (2014.11); *H04N 19/117* (2014.11); *H04N 19/17* (2014.11);
(Continued)

(58) Field of Classification Search
None
See application file for complete search history.

(56) References Cited

U.S. PATENT DOCUMENTS 7,742,524 B2 * 6/2010 Jeon .................. H04N 19/105
375/240.13
9,628,792 B2 * 4/2017 Rapaka ................ H04N 19/136
(Continued)

FOREIGN PATENT DOCUMENTS

WO 2014/025741 A2 2/2014
WO 2014/169156 A1 10/2014

OTHER PUBLICATIONS

Yamamoto et al., "AHG 13: Scale and reference position derivation for sub-region extraction", Joint Collaborative Team on Video Coding (JCT-VC) of ITU-T SG 16 WP 3 and ISO/IEC JTC 1/SC 29/WG 11, JCTVC-P0049, Jan. 9-17, 2014, pp. 1-4.
(Continued)

*Primary Examiner* — Chikaodili E Anyikire
(74) *Attorney, Agent, or Firm* — Keating & Bennett, LLP

(57) ABSTRACT

The amount of encoding of hierarchically encoded data is reduced with an improvement in the accuracy of a predicted image by including information for accurate derivation of a position of a reference layer pixel corresponding to a pixel in a higher layer, which is a target layer, in the hierarchically encoded data. A hierarchical moving image decoder includes a parameter set decoding unit decoding inter-layer phase correspondence information and a predicted image generator generating a predicted image on the basis of the inter-layer phase correspondence information.

3 Claims, 27 Drawing Sheets

(51) Int. Cl.

| | | |
|---|---|---|
| *H04N 11/04* | (2006.01) | |
| *H04N 19/33* | (2014.01) | |
| *H04N 19/70* | (2014.01) | |
| *H04N 19/172* | (2014.01) | |
| *H04N 19/103* | (2014.01) | |
| *H04N 19/117* | (2014.01) | |
| *H04N 19/174* | (2014.01) | |
| *H04N 19/187* | (2014.01) | |
| *H04N 19/40* | (2014.01) | |
| *H04N 19/44* | (2014.01) | |
| *H04N 19/17* | (2014.01) | |

(52) U.S. Cl.
CPC ......... *H04N 19/172* (2014.11); *H04N 19/174* (2014.11); *H04N 19/187* (2014.11); *H04N 19/40* (2014.11); *H04N 19/44* (2014.11); *H04N 19/70* (2014.11)

(56) References Cited

U.S. PATENT DOCUMENTS

| | | | | |
|---|---|---|---|---|
| 2009/0310680 | A1* | 12/2009 | Jeon | H04N 19/105 375/240.16 |
| 2014/0181885 | A1* | 6/2014 | Rusert | H04N 21/234327 725/131 |
| 2014/0192900 | A1* | 7/2014 | Deshpande | H04N 19/70 375/240.26 |
| 2014/0294063 | A1* | 10/2014 | Chen | H04N 19/105 375/240.02 |
| 2016/0112696 | A1* | 4/2016 | Dielacher | G01S 17/08 348/46 |
| 2016/0156912 | A1* | 6/2016 | Alshina | H04N 19/59 375/240.12 |
| 2016/0249056 | A1* | 8/2016 | Tsukuba | H04N 19/70 |

OTHER PUBLICATIONS

Official Communication issued in International Patent Application No. PCT/JP2014/076853, dated Jan. 6, 2015.

Chen et al., "SHVC Draft 3", Joint Collaborative Team on Video Coding (JCT-VC) of ITU-T SG 16 WP 3 and ISO/IEC JTC 1/SC 29/WG 11, JCTVC-N1008_v1, Jul. 25-Aug. 2, 2013, 70 pages.

Tech et al., "MV-HEVC Draft Text 5", Joint Collaborative Team on 3D Video Coding Extension Development of ITU-T 16 WP 3 and ISO/IEC JTC 1/SC 29/WG 11, JCT3V-E1004-v6, Jul. 27-Aug. 2, 2013, 65 pages.

International Telecommunication Union, "Series H: Audiovisual and Multimedia Systems, Infrastructure of audiovisual services—Coding of moving video, High efficiency video coding", Recommendation ITU-T H.265, Apr. 2013, 317 pages.

Yamamoto et al., "MV-HEVC/SHVC HLS: On conversion to ROI-oriented multi-layer bitstream", Joint Collaborative Team on Video Coding (JCT-VC) of ITU-T SG 16 WP 3 and ISO/IEC JTC 1/SC 29/WG 11, JCTVC-O0056-3V, Oct. 23-Nov. 1, 2013, pp. 1-5.

Sato et al., "Support of Field Coding for Signalling of Chroma Phase for Upsampling", Joint Collaborative Team on Video Coding (JCT-VC) of ITU-T SG 16 WP 3 and ISO/IEC JTC 1/SC 29/WG 11, JCTVC-N0248r1, Jul. 25-Aug. 2, 2013, pp. 1-4.

Kwon et al. "Reference-layer cropping offsets signaling in SHVC", Joint Collaborative Team on Video Coding (JCT-VC) of ITU-T SG 16 WP 3 and ISO/IEC JTC 1/SC 29/WG 11, JCTVC-M0219-r2, Apr. 18-26, 2013, pp. 1-5.

Minoo et al., "AHG13: SHVC Upsampling with phase offset adjustment", Joint Collaborative Team on Video Coding (JCT-VC) of ITU-T SG 16 WP 3 and ISO/IEC JTC 1/SC 29/WG 11, JCTVC-M0263-r1, pp. 1-7.

Dong et al., "Upsampling based on sampling grid information for aligned inter layer prediction" Joint Collaborative Team on Video Coding (JCT-VC) of ITU-T SG 16 WP 3 and ISO/IEC JTC 1/SC 29/WG 11, JCTVC-M0188r1, pp. 1-11.

* cited by examiner (a)

<RELATIONSHIP AMONG PICTURE, TILE, AND SLICE>

(b)

<RELATIONSHIP AMONG ENCODED DATA, TILE, AND SLICE>

FIG. 8

| seq_parameter_set_rbsp() { | Descriptor |
|---|---|
| ... | |
| pic_width_in_luma_samples | ue(v) |
| pic_height_in_luma_samples | ue(v) |
| ... | |
| } | |

FIG. 9

| seq_parameter_set_rbsp() { | Descriptor |
|---|---|
| ... | |
| conformance_window_flag | u(1) |
| if( conformance_window_flag) { | |
| conf_win_left_offset | ue(v) |
| conf_win_right_offset | ue(v) |
| conf_win_top_offset | ue(v) |
| conf_win_bottom_offset | ue(v) |
| } | |
| ... | |
| } | |

FIG. 11

| sps_extension ( ) { | Descriptor |
|---|---|
| ... | |
| num_scaled_ref_layer_offsets | ue(v) |
| for( i = 0; i < num_scaled_ref_layer_offsets; i++) { | |
|    scaled_ref_layer_left_offset[ i ] | se(v) |
|    scaled_ref_layer_top_offset[ i ] | se(v) |
|    scaled_ref_layer_right_offset[ i ] | se(v) |
|    scaled_ref_layer_bottom_offset[ i ] | se(v) |
| } | |
| ... | |
| } | |

| sps_extension() { | Descriptor |
|---|---|
| ... | |
| num_ref_layer_phase_offsets | ue(v) |
| for (i=0; i<num_ref_layer_phase_offsets; i++) { | |
| ref_layer_left_phase_offset[i] | u(v) |
| ref_layer_top_phase_offset[i] | u(v) |
| } | |
| ... | |
| } | |

FIG. 15

| sps_extension() { | Descriptor |
|---|---|
| ... | |
| num_cropped_ref_layer_offsets | ue(v) |
| for (i=0; i<num_cropped_ref_layer_offsets; i++) { | |
|     cropped_ref_layer_left_offset[i] | u(v) |
|     cropped_ref_layer_top_offset[i] | u(v) |
| } | |
| ... | |
| } | |

FIG. 16

| pic_parameter_set_rbsp( ) { | Descriptor |
|---|---|
| ... | |
| tiles_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| } | |

FIG. 17

|  | TileCol0 | TileCol1 | TileCol2 | TileCol3 | |
|---|---|---|---|---|---|
| TileRow0 | T00 | T01 | T02 | T03 | } RowHeight[0] |
| TileRow1 | T10 | T11 | T12 | T13 | |
| TileRow2 | T20 | T21 | T22 | T23 | |

ColWidth[0]

FIG. 19

| slice_segment_header( ) { | Descriptor |
|---|---|
|   first_slice_segment_in_pic_flag | u(1) |
|   ... | |
|   slice_pic_parameter_set_id | ue(v) |
|   if( !first_slice_segment_in_pic_flag ) { | |
|     ... | |
|     slice_segment_address | u(v) |
|   } | |
|   ... | |
| } | |

PICTURE (BEFORE CONVERSION)

| T00 | T01 | T02 |
|---|---|---|
| T10 | T11 | T12 |
| T20 | T21 | T22 |

REGION OF INTEREST (b)

PICTURE (AFTER CONVERSION)

| T01 | T02 |
|---|---|
| T11 | T12 |

REGION OF INTEREST

IMAGE DECODER, IMAGE ENCODER, AND ENCODED DATA CONVERTER

TECHNICAL FIELD

The present invention relates to an image decoder decoding hierarchically encoded data in which an image is hierarchically encoded, an image encoder generating hierarchically encoded data by hierarchically encoding an image, and an encoded data converter converting hierarchically encoded data.

BACKGROUND ART

One of the types of information transmitted in a communication system or information recorded in a storage device is an image or a moving image. In the related art, there is known an image encoding technology for transmission or storage of these images (hereinafter, include a moving image).

As a moving image encoding scheme, there is known H.264/MPEG-4 advanced video coding (AVC) or high-efficiency video coding (HEVC) as a follow-up codec thereof (NPL 1).

In these moving image encoding schemes, generally, a predicted image is generated on the basis of a locally decoded image obtained by encoding/decoding an input image, and encoded is a predicted residual (referred to as "difference image" or "residual difference image") obtained by subtracting the predicted image from the input image (source image). A method for generating the predicted image is exemplified by inter-frame prediction (inter prediction) and intra-frame prediction (intra prediction).

In intra prediction, the predicted image in one picture is generated in order on the basis of a locally decoded image in the same picture.

In inter prediction, the predicted image is generated by motion compensation between pictures. A previously decoded picture used in predicted image generation in inter prediction is referred to as a reference picture.

There is also known a technology that generates encoded data from a plurality of moving images by encoding a plurality of relevant moving images in layers (hierarchy), referred to as a hierarchical encoding technology. Encoded data generated by the hierarchical encoding technology is referred to as hierarchically encoded data.

As a representative hierarchical encoding technology, there is known scalable HEVC (SHVC) that is based on HEVC (NPL 2).

SHVC supports spatial scalability, temporal scalability, and SNR scalability. In spatial scalability, for example, hierarchically encoded data is generated by encoding a plurality of moving images of different resolutions in layers. For example, an image downsampled from a source image to a desired resolution is encoded as a lower layer. Next, inter-layer prediction is applied to the source image in order to remove inter-layer redundancy, and the source image is encoded as a higher layer.

As another representative hierarchical encoding technology, there is known multiview HEVC (MV-HEVC) that is based on HEVC (NPL 3).

MV-HEVC supports view scalability. In view scalability, hierarchically encoded data is generated by encoding a plurality of moving images corresponding to different viewpoints (views) in layers. For example, a moving image corresponding to a base viewpoint (base view) is encoded as a lower layer. Next, inter-layer prediction is applied to a moving image corresponding to a different viewpoint, and the moving image is encoded as a higher layer.

Types of inter-layer prediction in SHVC or in MV-HEVC include inter-layer image prediction and inter-layer motion prediction. In inter-layer image prediction, a lower layer decoded image is used to generate the predicted image. In inter-layer motion prediction, lower layer motion information is used to derive a predicted value of the motion information. A picture used in prediction in inter-layer prediction is referred to as an inter-layer reference picture. A layer included in the inter-layer reference picture is referred to as a reference layer. Hereinafter, the reference picture used in inter prediction and the reference picture used in inter-layer prediction will be collectively and simply referred to as a reference picture.

In SHVC or MV-HEVC, any of inter prediction, intra prediction, and inter-layer image prediction can be used in predicted image generation.

One of the types of applications using SHVC or MV-HEVC is a video application considering a region of interest. In a video reproducing terminal, for example, generally, the entire region of a video is reproduced at a comparatively low resolution. If a viewer of the video reproducing terminal specifies a part of the displayed video as a region of interest, the region of interest is displayed at a high resolution on the reproducing terminal.

The video application considering a region of interest can be realized by using hierarchically encoded data in which the entire region of the video at a comparatively low resolution is encoded as lower layer encoded data and the region of interest of the video at a high resolution encoded as higher layer encoded data. That is, only lower layer encoded data is decoded and reproduced in a case of reproducing the entire region, and higher layer encoded data is transmitted in addition to the lower layer encoded data in a case of reproducing the region of interest of the video at a high resolution. Thus, the application can be realized with a small transmission bandwidth in comparison with a case of transmitting both of the encoded data of the low-resolution video and the encoded data of the high-resolution video.

CITATION LIST

Non Patent Literature

NPL 1: "Recommendation H.265 (04/13)", ITU-T (published on Jun. 7, 2013)

NPL 2: JCT3V-E1004_v6 "MV-HEVC Draft Text 5", Joint Collaborative Team on 3D Video Coding Extension Development of ITU-T SG16 WP3 and ISO/IEC JTC 1/SC 29/WG 11 5th Meeting: Vienna, AT, Jul. 27 to Aug. 2, 2013 (published on Aug. 7, 2013)

NPL 3: JCTVC-N1008_v1 "SHVC Draft 3", Joint Collaborative Team on Video Coding (JCT-VC) of ITU-T SG16 WP3 and ISO/IEC JTC 1/SC 29/WG 11 14th Meeting: Vienna, AT, Jul. 25 to Aug. 2, 2013 (published on Aug. 20, 2013)

SUMMARY OF INVENTION

Technical Problem

If, however, higher layer encoded data corresponding to the entire region of the video at a high resolution is transmitted regardless of the region of interest, a problem arises in that an encoding amount is significantly increased in comparison with a case of transmitting only lower layer encoded data.

If higher layer encoded data including only the region of interest is generated, a problem arises in that the generation requires a large amount of processing. For example, if the region of interest is differently specified for each user, it may be necessary to generate higher layer encoded data differently for each user. If generation of such higher layer encoded data requires a large amount of processing, a problem arises in that it is difficult to generate and transmit higher layer encoded data corresponding to the regions of interest of multiple users.

If the size of a higher layer picture is changed in accordance with the region of interest in a case of generating higher layer encoded data including only the region of interest, a positional relationship between a higher layer pixel and a lower layer pixel is changed, in which case a problem arises in that the accuracy of prediction is decreased in a case of predicting a higher layer pixel value based on a lower layer pixel value.

The present invention is conceived in view of the above problems, and an object thereof is to realize an image encoder and an image decoder capable of encoding/decoding any of higher layer encoded data corresponding to an entire region and higher layer encoded data corresponding to a region of interest in a hierarchical encoding scheme.

In addition, an object of the present invention is to realize an image encoder and an image decoder capable of encoding/decoding higher layer encoded data that includes only the region of interest and corresponds to encoded data in which a positional relationship between a higher layer pixel and a lower layer pixel is correctly associated.

In addition, an object of the present invention is to realize a data structure of encoded data in which higher layer encoded data corresponding to the region of interest can be generated from higher layer encoded data corresponding to the entire region without generation of a decoded image, and to realize an encoded data converter generating the higher layer encoded data corresponding to the region of interest from the higher layer encoded data.

Solution to Problem

In order to resolve the problems, an image decoder according to the present invention is an image decoder that decodes higher layer encoded data included in hierarchically encoded data and restores a decoded picture in a higher layer which is a target layer, the decoder including a parameter set decoding unit that decodes a parameter set, and a predicted image generator that generates a predicted image using inter-layer prediction by referencing a decoded pixel of a reference layer picture, in which the parameter set decoding unit decodes inter-layer phase correspondence information that is information related to a target layer pixel and a position on the reference layer picture corresponding to the target layer pixel.

In order to resolve the problems, an image encoder according to the present invention is an image encoder that generates higher layer encoded data from an input image, the encoder including a parameter set decoding unit that decodes a parameter set, and a predicted image encoding unit that generates a predicted image using inter-layer prediction by referencing a decoded pixel of a reference layer picture, in which the parameter set decoding unit encodes inter-layer phase correspondence information that is information related to a target layer pixel and a position on the reference layer picture corresponding to the target layer pixel, and the predicted image encoding unit, at a time of performing inter-layer prediction, performs a corresponding reference position derivation process that derives a reference layer position corresponding to a predicted target pixel on the basis of the inter-layer phase correspondence information.

In order to resolve the problems, a hierarchically encoded data converter according to the present invention is a hierarchically encoded data converter that converts input hierarchically encoded data on the basis of input region of interest information and outputs hierarchically encoded data after conversion, the converter including a parameter set decoding unit that decodes a parameter set before correction from the input hierarchically encoded data, a parameter set corrector that corrects the parameter set before correction on the basis of the input region of interest information and generates a parameter set after correction, and an NAL selector that selects a coding layer NAL included in the output hierarchically encoded data on the basis of tile information and the region of interest information, in which the NAL selector regards a tile having at least a part of a region overlapping with a region of interest indicated by the region of interest information as an extraction target tile and selects a video coding layer NAL corresponding to a slice included in the extraction target tile as a video coding layer NAL to be included in the hierarchically encoded data after conversion, and the parameter set corrector corrects a size of a picture and the tile information included in the parameter set on the basis of the extraction target tile.

Advantageous Effects of Invention

The image decoder according to the present invention is an image decoder that decodes higher layer encoded data included in hierarchically encoded data and restores a decoded picture in a higher layer which is a target layer, the decoder including a parameter set decoding unit that decodes a parameter set, and a predicted image generator that generates a predicted image using inter-layer prediction by referencing a decoded pixel of a reference layer picture, in which the parameter set decoding unit decodes inter-layer phase correspondence information that is information related to a target layer pixel and a position on the reference layer picture corresponding to the target layer pixel.

Therefore, since the image decoder according to the present invention can derive an accurate position on the reference layer picture corresponding to the predicted target pixel using the inter-layer phase correspondence information, the accuracy of a predicted pixel generated by an interpolation process is improved. Thus, the higher layer decoded picture can be output by decoding encoded data of which the amount of encoding is smaller than that in the related art.

BRIEF DESCRIPTION OF DRAWINGS

FIG. 2(a) illustrates a hierarchical moving image encoder side, and FIG. 2(b) illustrates a hierarchical moving image decoder side.

FIG. 3(a) illustrates a sequence layer defining a sequence SEQ, FIG. 3(b) illustrates a picture layer defining a picture PICT, FIG. 3(c) illustrates a slice layer defining a slice S, FIG. 3(d) illustrates a CTU layer defining a coding tree unit CTU, and FIG. 3(e) illustrates a CU layer defining a coding unit (CU) included in the coding tree unit CTU.

FIG. 4(a) illustrates split regions in a case of splitting the picture by tiles or slices, and FIG. 4(b) illustrates a relationship between tiles and slices in an encoded data configuration.

FIG. 8 is a part of a syntax table referenced in SPS decoding and related to picture information.

FIG. 9 is a part of a syntax table referenced in SPS decoding and related to display region information.

FIG. 11 is a part of a syntax table referenced in SPS decoding and related to inter-layer pixel correspondence information.

FIG. 12(a) illustrates a case where the entire reference layer picture corresponds to a part of the target layer picture, and FIG. 12(b) illustrates a case where a part of the reference layer picture corresponds to the entire target layer picture.

FIG. 13 is a part of a syntax table referenced in SPS decoding and related to inter-layer phase correspondence information.

FIG. 15 is another example of the part of the syntax table referenced in SPS decoding and related to inter-layer phase correspondence information.

FIG. 16 is a part of a syntax table referenced in PPS decoding and related to tile information.

FIG. 17 is a diagram illustrating tile rows and tile columns in a case where a picture is split into tiles.

FIG. 19 is a part of a syntax table referenced in slice header decoding and related to slice position information.

FIG. 24 is a diagram illustrating a relationship among a picture, a region of interest, and tiles in hierarchically encoded data before and after conversion.

FIG. 26(a) illustrates the transmission device on which the hierarchical moving image encoder is mounted, and FIG. 26(b) illustrates the reception device on which the hierarchical moving image decoder is mounted.

FIG. 27(a) illustrates the recording device on which the hierarchical moving image encoder is mounted, and FIG. 27(b) illustrates the reproduction device on which the hierarchical moving image decoder is mounted.

DESCRIPTION OF EMBODIMENTS

A hierarchical moving image decoder 1, a hierarchical moving image encoder 2, and an encoded data converter 3 according to one embodiment of the present invention will be described as follows on the basis of FIG. 1 to FIG. 27.

[Summary]

The hierarchical moving image decoder (image decoder) 1 according to the present embodiment decodes encoded data that is hierarchically encoded by the hierarchical moving image encoder (image encoder) 2. Hierarchical encoding is an encoding scheme that hierarchically encodes a moving image from a low-quality one to a high-quality one. Hierarchical encoding is standardized in, for example, SVC or SHVC. The quality of a moving image referred hereto widely means elements that affect the subjective and objective look of a moving image. The quality of a moving image includes, for example, "resolution", "frame rate", "definition", and "pixel representation accuracy". Thus, hereinafter, the quality of a moving image being different will illustratively indicate difference in "resolution" or the like, though the present embodiment is not limited to this. For example, the quality of a moving image is said to be different in a case where the moving image is quantized in different quantization steps (that is, in a case of a moving image that is encoded with different encoding noises).

From the viewpoint of the types of information hierarchized, a hierarchical encoding technology may be classified into (1) spatial scalability, (2) temporal scalability, (3) signal-to-noise ratio (SNR) scalability, and (4) view scalability. Spatial scalability is a technology for hierarchization in resolution or image size. Temporal scalability is a technology for hierarchization in frame rate (number of frames per unit time). SNR scalability is a technology for hierarchization in encoding noise. View scalability is a technology for hierarchization in viewpoint position associated with each image.

The encoded data converter 3 according to the present embodiment converts encoded data that is hierarchically encoded by the hierarchical moving image encoder 2 to generate encoded data related to a predetermined region of interest (region of interest encoded data). The region of interest encoded data can be decoded by the hierarchical moving image decoder 1 according to the present embodiment.

Prior to detailed descriptions of the hierarchical moving image encoder 2, the hierarchical moving image decoder 1, and the hierarchically encoded data converter 3 according to the present embodiment, first, (1) a layer structure of hierarchically encoded data generated by either the hierarchical moving image encoder 2 or the hierarchically encoded data converter 3 and decoded by the hierarchical moving image decoder 1 will be described, and next, (2) a specific data structure example employable in each layer will be described.

[Layer Structure of Hierarchically Encoded Data]

Figure 2:
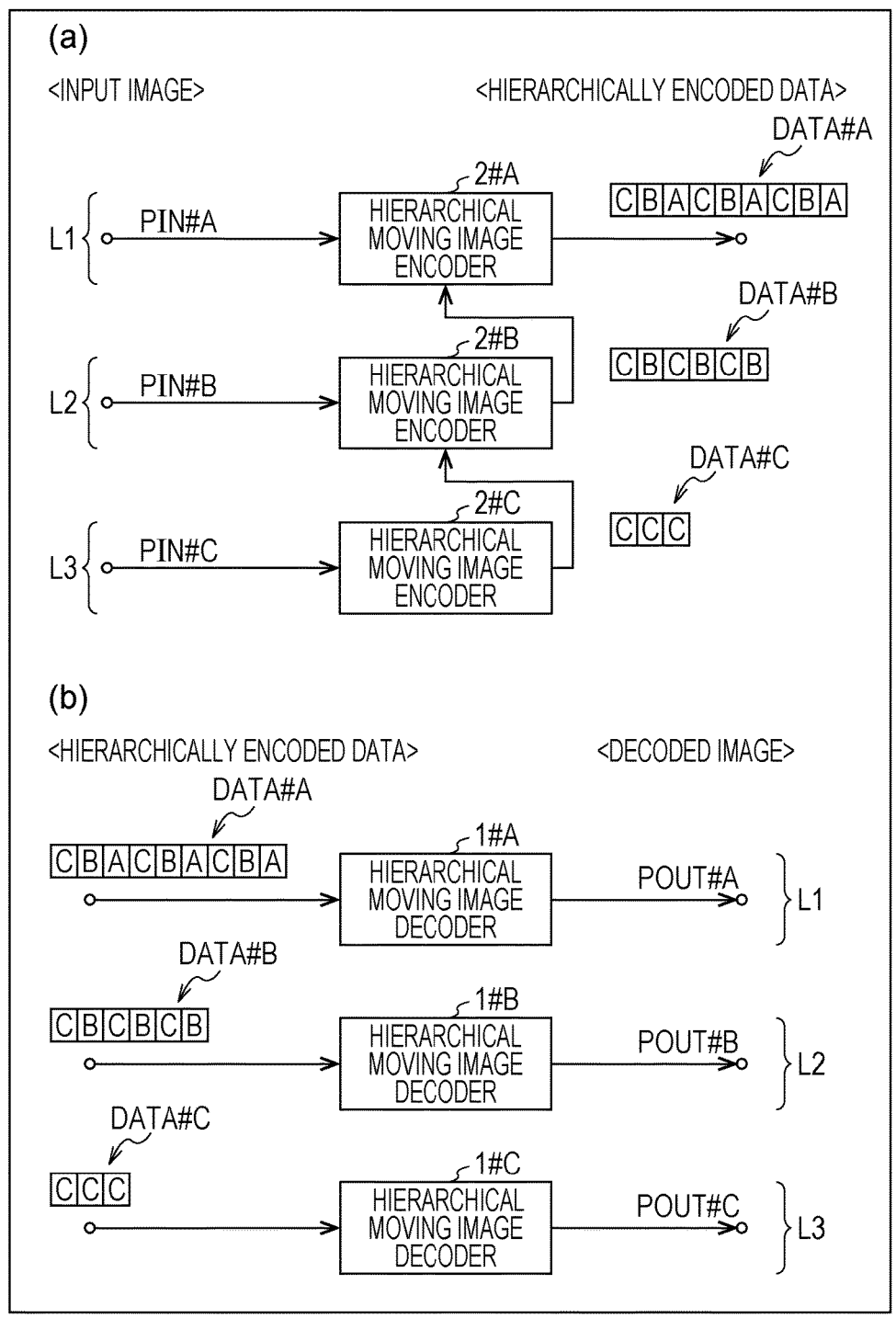
FIG. 2 is a diagram illustrating a layer structure of hierarchically encoded data according to one embodiment of the present invention.

Encoding and decoding of hierarchically encoded data will be described as follows by using FIG. 2. FIG. 2 is a diagram schematically illustrating a case of hierarchically encoding/decoding a moving image in three layers of a lower layer L3, an intermediate layer L2, and a higher layer L1. That is, in the example illustrated in FIGS. 2(a) and 2(b), the higher layer L1 is the highest layer, and the lower layer L3 is the lowest layer of the three layers.

Hereinafter, a decoded image corresponding to specific quality decodable from hierarchically encoded data will be referred to as a decoded image in a specific layer (or a decoded image corresponding to a specific layer) (for example, a decoded image POUT#A in the higher layer L1).

FIG. 2(a) illustrates hierarchical moving image encoders 2#A to 2#C that respectively and hierarchically encode input images PIN#A to PIN#C to generate encoded data DATA#A to DATA#C. FIG. 2(b) illustrates hierarchical moving image decoders 1#A to 1#C that respectively decode the hierarchically encoded data DATA#A to DATA#C to generate decoded images POUT#A to POUT#C.

First, the encoder side will be described by using FIG. 2(a). The input images PIN#A, PIN#B, and PIN#C that are input on the encoder side have the same source image but have different image quality (resolution, frame rate, definition, and the like). The image quality decreases in order of the input images PIN#A, PIN#B, and PIN#C.

The hierarchical moving image encoder 2#C in the lower layer L3 encodes the input image PIN#C in the lower layer L3 to generate the encoded data DATA#C in the lower layer L3. The encoded data DATA#C includes base information necessary for decoding of the decoded image POUT#C in the lower layer L3 (indicated by "C" in FIG. 2). Since the lower layer L3 is the lowest layer, the encoded data DATA#C in the lower layer L3 is referred to as base encoded data.

The hierarchical moving image encoder 2#B in the intermediate layer L2 encodes the input image PIN#B in the intermediate layer L2 while referencing the lower layer encoded data DATA#C to generate the encoded data DATA#B in the intermediate layer L2. The encoded data DATA#B in the intermediate layer L2 includes additional information necessary for decoding of the intermediate layer decoded image POUT#B (indicated by "B" in FIG. 2) in addition to the base information "C" included in the encoded data DATA#C.

The hierarchical moving image encoder 2#A in the higher layer L1 encodes the input image PIN#A in the higher layer L1 while referencing the encoded data DATA#B in the intermediate layer L2 to generate the encoded data DATA#A in the higher layer L1. The encoded data DATA#A in the higher layer L1 includes additional information necessary for decoding of the higher layer decoded image POUT#A (indicated by "A" in FIG. 2) in addition to the base information "C" necessary for decoding of the decoded image POUT#C in the lower layer L3 and the additional information "B" necessary for decoding of the decoded image POUT#B in the intermediate layer L2.

As such, the encoded data DATA#A in the higher layer L1 includes information related to decoded images of a plurality of different qualities.

Next, the decoder side will be described with reference to FIG. 2(b). On the decoder side, the decoders 1#A, 1#B, and 1#C respectively corresponding to the higher layer L1, the intermediate layer L2, and the lower layer L3 decode the encoded data DATA#A, DATA#B, and DATA#C and output the decoded images POUT#A, POUT#B, and POUT#C.

A moving image of specific quality can be reproduced by extracting partial information from the higher layer hierarchically encoded data and decoding the extracted information in a specific lower decoder.

For example, the hierarchical decoder 1#B in the intermediate layer L2 may extract information necessary for decoding of the decoded image POUT#B (that is, "B" and "C" included in the hierarchically encoded data DATA#A) from the hierarchically encoded data DATA#A in the higher layer L1 and perform decoding of the decoded image POUT#B. In other words, on the decoder side, decoding can be performed for the decoded images POUT#A, POUT#B, and POUT#C on the basis of information included in the hierarchically encoded data DATA#A in the higher layer L1.

Hierarchically encoded data is not limited to the above three-layer hierarchically encoded data and may be data that is hierarchically encoded in two layers or data that is hierarchically encoded in more than three layers.

Hierarchically encoded data may be configured by encoding a part of or the entirety of the encoded data related to a decoded image in a specific layer independently of other layers so that information about other layers is not referenced at the time of decoding the specific layer. For example, while "C" and "B" are referenced in decoding of the decoded image POUT#B in the example described by using FIGS. 2(a) and 2(b), the present embodiment is not limited to this. Hierarchically encoded data may be configured so that decoding can be performed by using only "B" for the decoded image POUT#B. For example, it is possible to configure a hierarchical moving image decoder in which hierarchically encoded data configured of only "B" and the decoded image POUT#C are input in decoding of the decoded image POUT#B.

In a case of realizing SNR scalability, generation of hierarchically encoded data can be such that the definition of the decoded images POUT#A, POUT#B, and POUT#C is different while the same source image is used as the input images PIN#A, PIN#B, and PIN#C. In this case, a lower layer hierarchical moving image encoder quantizes a prediction residual using a larger quantization range in comparison with a higher layer hierarchical moving image encoder to generate hierarchically encoded data.

The following terms are defined in the present specification for convenience of description. The following terms are used to represent technical matters below unless otherwise specified.

Higher layer: One layer positioned higher than another layer is referred to as a higher layer. For example, higher layers above the lower layer L3 are the intermediate layer L2 and the higher layer L1 in FIG. 2. A higher layer decoded image refers to a decoded image of higher quality (for example, high resolution, high frame rate, high definition, and the like).

Lower layer: One layer positioned lower than another layer is referred to as a lower layer. For example, lower layers below the higher layer L1 are the intermediate layer L2 and the lower layer L3 in FIG. 2. A lower layer decoded image refers to a decoded image of lower quality.

Target layer: A target layer refers to a layer corresponding to a decoding or encoding target. A decoded image corresponding to the target layer is referred to as a target layer picture. A pixel constituting the target layer picture is referred to as a target layer pixel.

Reference layer: A specific lower layer that is referenced in decoding of a decoded image corresponding to the target layer is referred to as a reference layer. A decoded image corresponding to the reference layer is referred to as a reference layer picture. A pixel constituting the reference layer is referred to as a reference layer pixel.

In the example illustrated in FIGS. 2(a) and 2(b), reference layers for the higher layer L1 are the intermediate layer L2 and the lower layer L3. However, the present embodiment is not limited to this. A configuration of hierarchically encoded data can be such that not all lower layers are referenced in decoding in the above specific layer. For example, a configuration of hierarchically encoded data can be such that one of the intermediate layer L2 and the lower layer L3 is the reference layer for the higher layer L1.

Base layer: A layer that is positioned lowest is referred to as a base layer. A base layer decoded image is a decoded image of the lowest quality decodable from encoded data and is referred to as a base decoded image. In other words, a base decoded image refers to a decoded image corresponding to the lowest layer. Partially encoded data of hierarchically encoded data necessary for decoding of the base decoded image is referred to as base encoded data. For example, the base information "C" included in the hierarchically encoded data DATA#A in the higher layer L1 is the base encoded data.

Enhancement layer: A higher layer above the base layer is referred to as an enhancement layer.

Layer identifier: A layer identifier is for identification of a layer and corresponds one-to-one to a layer. Hierarchically encoded data includes the layer identifier that is used for selecting partial encoded data necessary for decoding of a decoded image in a specific layer. A subset of hierarchically encoded data associated with the layer identifier corresponding to a specific layer is referred to as a layer representation.

Generally, in decoding of a decoded image in a specific layer, a layer representation of the layer and/or a layer representation corresponding to a lower layer below the layer are used. That is, in decoding of a target layer decoded image, a layer representation of the target layer and/or a layer representation of one or more layers included in lower layers below the target layer are used.

Inter-layer prediction: Inter-layer prediction refers to prediction of a syntax element value of the target layer or of an encoding parameter and the like used in decoding in the target layer, based on a syntax element value included in a layer representation of a layer (reference layer) different from a layer representation of the target layer, a value derived from the syntax element value, and a decoded image. Inter-layer prediction that predicts information related to motion prediction from information about the reference layer is referred to as motion information prediction. Inter-layer prediction that performs prediction from a lower layer decoded image is referred to as inter-layer image prediction (or inter-layer texture prediction). A layer used in inter-layer prediction is illustratively a lower layer below the target layer. Prediction performed in the target layer without use of the reference layer is referred to as intra-layer prediction.

The above terms are only for convenience of description, and the above technical matters may be represented by other terms.

[Data Structure of Hierarchically Encoded Data]

Hereinafter, HEVC and an extended scheme thereof will be illustratively used as an encoding scheme for generating encoded data in each layer. However, the present embodiment is not limited to this, and encoded data in each layer may be generated by an encoding scheme such as MPEG-2 or H.264/AVC.

A lower layer and a higher layer may be encoded by different encoding schemes. Encoded data in each layer may be supplied through different transmission paths to the hierarchical moving image decoder 1 or may be supplied through the same transmission path to the hierarchical moving image decoder 1.

For example, in a case of transmitting an ultra-high-definition video (moving image, 4K video data) by scalable encoding with the base layer and one enhancement layer, the 4K video data, in the base layer, may be downscaled, and the interlaced video data may be encoded by MPEG-2 or H.264/AVC and transmitted through a television broadcasting network, and in the enhancement layer, the 4K video (progressive) may be encoded by HEVC and transmitted through the Internet.

(Base Layer)

Figure 3:
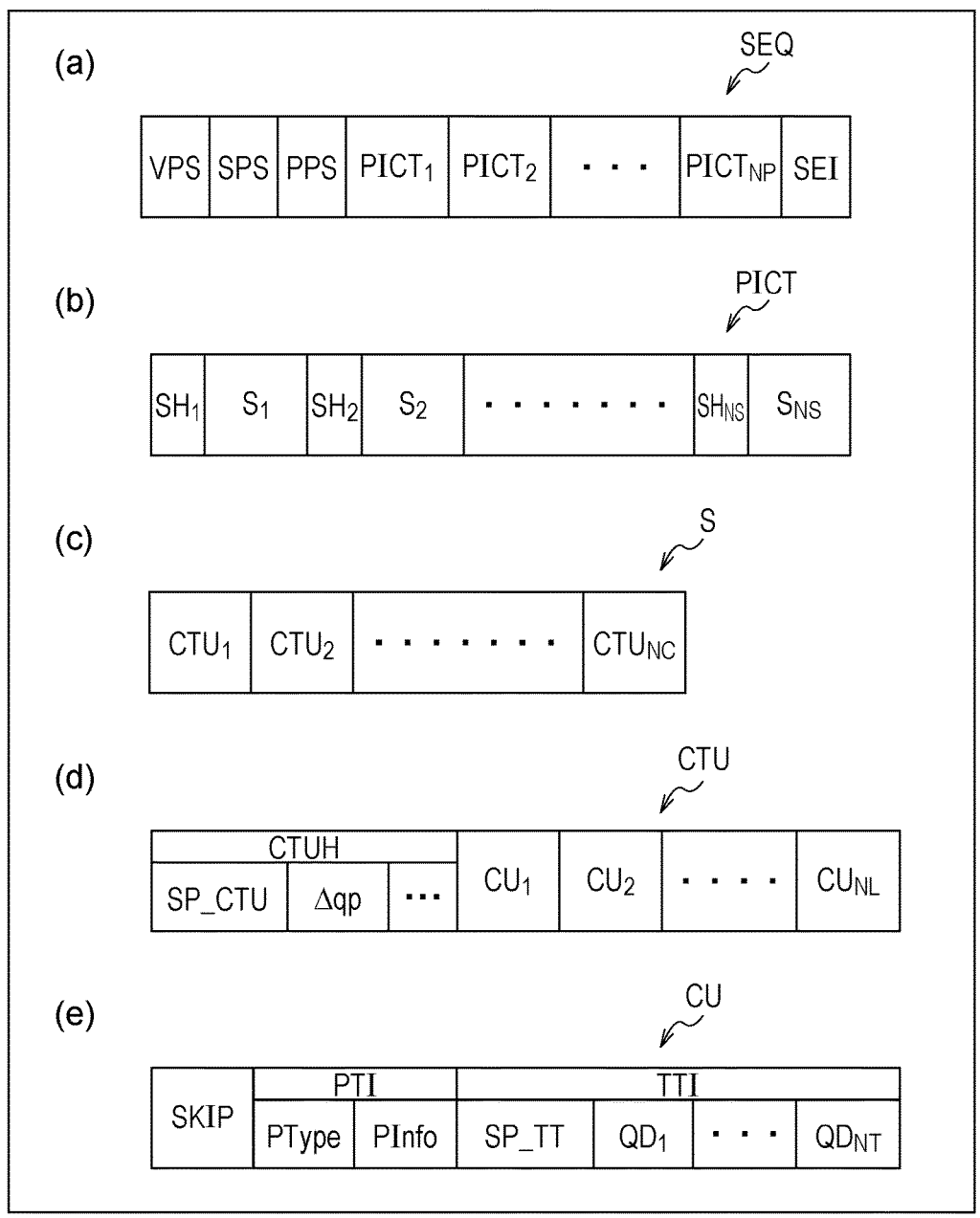
FIG. 3 is a diagram illustrating a configuration of hierarchically encoded data according to one embodiment of the present invention.

FIG. 3 is a diagram illustrating a data structure of encoded data employable in the base layer (hierarchically encoded data DATA#C in the example of FIG. 2). The hierarchically encoded data DATA#C illustratively includes a sequence and a plurality of pictures constituting the sequence.

A layer structure of data in the hierarchically encoded data DATA#C is illustrated in FIG. 3. FIGS. 3(a) to 3(e) are diagrams respectively illustrating a sequence layer defining a sequence SEQ, a picture layer defining a picture PICT, a slice layer defining a slice S, a CTU layer defining a coding tree unit (CTU), and a CU layer defining a coding unit (CU) included in the coding tree unit CTU.

(Sequence Layer)

A set of data referenced by the hierarchical moving image decoder 1 for decoding of the processing target sequence SEQ (hereinafter, referred to as a target sequence) is defined in the sequence layer. The sequence SEQ, as illustrated in FIG. 3(a), includes a video parameter set VPS, a sequence parameter set SPS, a picture parameter set PPS, pictures $PICT_1$ to $PICT_{NP}$ (where NP is the total number of pictures included in the sequence SEQ), and supplemental enhancement information SEI.

The number of layers included in encoded data and dependency between layers are defined in the video parameter set VPS.

A set of encoding parameters referenced by the hierarchical moving image decoder 1 for decoding of the target sequence is defined in the sequence parameter set SPS. The SPS may be present in plural quantities in encoded data. In that case, the SPS used in decoding is selected from a plurality of candidates for each target sequence. The SPS used in decoding of a specific sequence is referred to as an active SPS. Hereinafter, the SPS will mean the active SPS for the target sequence unless otherwise specified.

A set of encoding parameters referenced by the hierarchical moving image decoder 1 for decoding of each picture in the target sequence is defined in the picture parameter set PPS. The PPS may be present in plural quantities in encoded data. In that case, one of the plurality of PPSs is selected from each picture in the target sequence. The PPS used in decoding of a specific picture is referred to as an active PPS. Hereinafter, the PPS will mean the active PPS for a target picture unless otherwise specified.

The active SPS and the active PPS may be set to an SPS and a PPS different for each layer.

(Picture Layer)

A set of data referenced by the hierarchical moving image decoder 1 for decoding of the processing target picture PICT (hereinafter, referred to as a target picture) is defined in the picture layer. The picture PICT, as illustrated in FIG. 3(b), includes slice headers $SH_1$ to $SH_{NS}$ and slices $S_1$ to $S_{NS}$ (where NS is the total number of slices included in the picture PICT).

In the description below, unless required to distinguish the slice headers $SH_1$ to $SH_{NS}$ or the slices $S_1$ to SNS from each other, the suffix of the reference sign thereof may be omitted. The same applies to other data appended with a suffix that is included in the hierarchically encoded data DATA#C described below.

The slice header $SH_k$ includes an encoding parameter group referenced by the hierarchical moving image decoder 1 for determination of a decoding method for the corresponding slice $S_k$. For example, included are an SPS identifier (seq_parameter_set_id) specifying the SPS and a PPS identifier (pic_parameter_set_id) specifying the PPS. Slice type specification information (slice_type) that specifies a slice type is an example of the encoding parameters included in the slice header SH.

The slice types specifiable by the slice type specification information are exemplified by (1) an I slice for which only intra prediction is used at the time of encoding, (2) a P slice for which either uni-directional prediction or intra prediction is used at the time of encoding, and (3) a B slice for which either uni-directional prediction, bi-directional prediction, or intra prediction is used at the time of encoding.

(Slice Layer)

A set of data referenced by the hierarchical moving image decoder 1 for decoding of the processing target slice S (referred to as a target slice) is defined in the slice layer. The slice S, as illustrated in FIG. 3(c), includes coding tree units $CTU_1$ to $CTU_{NC}$ (where NC is the total number of CTUs included in the slice S).

(CTU Layer)

A set of data referenced by the hierarchical moving image decoder 1 for decoding of the processing target coding tree unit CTU (hereinafter, referred to as target CTU) is defined in the CTU layer. The coding tree unit may be referred to as a coding tree block (CTB) or a largest coding unit (LCU).

The coding tree unit CTU includes a CTU header CTUH and coding unit information $CU_1$ to $CU_{NL}$ (where NL is the total number of pieces of coding unit information included in CTU). First, a relationship between the coding tree unit CTU and the coding unit information CU will be described as follows.

The coding tree unit CTU is split into units specifying a block size for various processing of intra prediction or inter prediction and conversion.

The units of the coding tree unit CTU are split by recursive quadtree subdivision. Hereinafter, a tree structure obtained by recursive quadtree subdivision will be referred to as a coding tree.

Hereinafter, a unit corresponding to a leaf that is a terminal node of the coding tree will be referred to as a coding node. The coding node is the base unit of an encoding process. Thus, hereinafter, the coding node will be referred to as a coding unit (CU).

That is, the coding unit information (hereinafter, referred to as CU information) $CU_1$ to $CU_{NL}$ is information corresponding to each coding node (coding unit) obtained by recursive quadtree subdivision of the coding tree unit CTU.

A root of the coding tree is associated with the coding tree unit CTU. In other words, the coding tree unit CTU is associated with the highest node of the quadtree subdivision tree structure that recursively includes a plurality of coding nodes.

The size of each coding node is half the vertical and horizontal size of a coding node that is a parent node of the coding node (that is, a node that is one layer above the coding node).

The size of the coding tree unit CTU and the size that each coding unit may have are dependent on minimum coding node size specification information included in the sequence parameter set SPS and the difference in hierarchy depth between a maximum coding node and a minimum coding node. For example, if the size of the minimum coding node is 8×8 pixels and the difference in hierarchy depth between the maximum coding node and the minimum coding node is three, the size of the coding tree unit CTU is 64×64 pixels, and the size of the coding node may be one of four sizes, that is, 64×64 pixels, 32×32 pixels, 16×16 pixels, and 8×8 pixels.

(CTU Header)

The CTU header CTUH includes encoding parameters referenced by the hierarchical moving image decoder 1 for determination of a decoding method for the target CTU. Specifically, as illustrated in FIG. 3(d), included are CTU split information SP_CTU specifying a pattern for splitting of the target CTU into each CU and a quantization parameter difference Δqp (qp_delta) specifying a quantization step size.

The CTU split information SP_CTU is information indicating a coding tree for splitting of the CTU and, specifically, is information specifying the form and size of each CU included in the target CTU and the position thereof in the target CTU.

The CTU split information SP_CTU may not explicitly include the form or size of the CU. For example, the CTU split information SP_CTU may be a set of flags indicating whether to split the entire target CTU or a partial region of the CTU into four parts. In that case, the form or size of each CU can be specified by using the form or size of the CTU together.

The quantization parameter difference Δqp is a difference qp−qp' between a quantization parameter qp in the target CTU and a quantization parameter qp' in the CTU encoded immediately before the target CTU.

(CU Layer)

A set of data referenced by the hierarchical moving image decoder 1 for decoding of the processing target CU (hereinafter, referred to as a target CU) is defined in the CU layer.

Prior to a description of a specific content of data included in the CU information CU, a tree structure of data included in the CU will be described. The coding node is the root node of a prediction tree (PT) and a transform tree (TT). The prediction tree and the transform tree will be described as follows.

The coding node is split into one or a plurality of prediction blocks, and the position and size of each prediction block are defined in the prediction tree. In other words, a prediction block is one or a plurality of non-overlapping regions constituting the coding node. The prediction tree includes one or a plurality of prediction blocks obtained by the splitting described above.

A prediction process is performed for each prediction block. Hereinafter, the prediction block that is the unit of prediction will be referred to as a prediction unit (PU).

Types of splitting in the prediction tree (hereinafter, abbreviated as PU splitting) include, broadly, two cases of intra prediction and inter prediction.

In a case of intra prediction, a split method includes 2N×2N (the same size as the coding node) and N×N.

In a case of inter prediction, a split method includes 2N×2N (the same size as the coding node), 2N×N, 2N×nU, 2N×nD, N×2N, nL×2N, nR×2N, and the like.

The coding node is split into one or a plurality of transform blocks, and the position and size of each transform block are defined in the transform tree. In other words, a transform block is one or a plurality of non-overlapping regions constituting the coding node. The transform tree includes one or a plurality of transform blocks obtained by the splitting described above.

Splitting in the transform tree includes allocating a region of the same size as the coding node as the transform block and recursive quadtree subdivision as in the splitting of tree blocks described above.

A transform process is performed for each transform block. Hereinafter, the transform block that is the unit of transformation will be referred to as a transform unit (TU).

(Data Structure of CU Information)

Next, a specific content of data included in the CU information CU will be described with reference to FIG. 3(e). As illustrated in FIG. 3(e), the CU information CU includes, specifically, a skip flag SKIP, prediction tree information (hereinafter, abbreviated as PT information) PTI, and transform tree information (hereinafter, abbreviated as TT information) TTI.

The skip flag SKIP is a flag indicating whether a skip mode is applied to the target PU. If the value of the skip flag SKIP is one, that is, if the skip mode is applied to the target CU, part of the PT information PTI and the TT information TTI in the CU information CU are omitted. The skip flag SKIP is omitted in the I slice.

[PT Information]

The PT information PTI is information related to the prediction tree (hereinafter, abbreviated as PT) included in the CU. In other words, the PT information PTI is a set of information related to one or each of a plurality of PUs included in PT and is referenced by the hierarchical moving image decoder 1 at the time of generation of a predicted image. The PT information PTI, as illustrated in FIG. 3(e), includes prediction type information PType and prediction information PInfo.

The prediction type information PType is information specifying a predicted image generation method for the target PU, that is, information specifying whether to use intra prediction or to use inter prediction in the base layer.

The prediction information PInfo is prediction information used in the prediction method specified by the prediction type information PType. In a case of intra prediction in the base layer, intra prediction information PP_Intra is included. In a case of inter prediction, inter prediction information PP_Inter is included.

The inter prediction information PP_Inter includes prediction information that is referenced by the hierarchical moving image decoder 1 at the time of generating an inter prediction image with inter prediction. More specifically, the inter prediction information PP_Inter includes inter PU split information specifying a pattern for splitting of the target CU into each inter PU and inter prediction parameters (motion compensation parameters) for each inter PU. Examples of the inter prediction parameters include a merge flag (merge_flag), a merge index (merge_idx), an estimated motion vector index (mvp_idx), a reference picture index (ref_idx), an inter prediction flag (inter_pred_flag), and a motion vector residual (mvd).

The intra prediction information PP_Intra includes encoding parameters that are referenced by the hierarchical moving image decoder 1 at the time of generating an intra prediction image with intra prediction. More specifically, the intra prediction information PP_Intra includes intra PU split information specifying a pattern for splitting of the target CU into each intra PU and intra prediction parameters for each intra PU. The intra prediction parameters are parameters for specifying an intra prediction method (prediction mode) for each intra PU.

The intra prediction parameters are parameters for restoring intra prediction (prediction mode) for each intra PU. The parameters for restoring the prediction mode include mpm_flag that is a flag related to a most probable mode (hereinafter, MPM), mpm_idx that is an index for selecting the MPM, and rem_idx that is an index for specifying a prediction mode other than the MPM. The MPM is an estimated prediction mode of the high possibility of being selected by a target partition. For example, the MPM may include an estimated prediction mode estimated on the basis of a prediction mode allocated to a partition around the target partition and a DC mode and a Planar mode generally having a high probability of occurrence.

Hereinafter, "prediction mode", if simply written, will refer to a luma prediction mode unless otherwise specified. A chroma prediction mode will be written as "chroma prediction mode" in order to be distinguished from the luma prediction mode. The parameters for restoring the prediction mode include chroma_mode that is a parameter for specifying the chroma prediction mode.

[TT Information]

The TT information TTI is information related to the transform tree (hereinafter, abbreviated as TT) included in the CU. In other words, the TT information TTI is a set of information related to one or each of a plurality of transform blocks included in the TT and is referenced by the hierarchical moving image decoder 1 at the time of decoding of residual data.

The TT information TTI, as illustrated in FIG. 3(e), includes TT split information SP_TT specifying a pattern for splitting of the target CU into each transform block and quantized prediction residuals $QD_1$ to $QD_{NT}$ (where NT is the total number of blocks included in the target CU).

The TT split information SP_TT, specifically, is information for determination of the form of each transform block included in the target CU and the position thereof in the target CU. For example, the TT split information SP_TT can be realized from information indicating whether to split a target node (split_transform_unit_flag) and information indicating a split depth (trafoDepth).

Each transform block obtained by splitting may have a size of 4×4 pixels to 32×32 pixels if, for example, the size of the CU is 64×64.

Each quantized prediction residual QD is encoded data generated by the hierarchical moving image encoder 2 performing the following Processes 1 to 3 on a target block that is a processing target transform block.

Process 1: Perform frequency transformation (for example, discrete cosine transform (DCT) and discrete sine transform (DST)) on the prediction residual resulting from subtracting the predicted image from an encoding target image.

Process 2: Quantize a transform coefficient obtained by Process 1.

Process 3: Encode the transform coefficient quantized by Process 2 in a variable-length manner.

The quantization parameter qp represents the size of a quantization step QP ($QP=2^{qp/6}$) used by the hierarchical moving image encoder 2 to quantize the transform coefficient.

(PU Split Information)

A PU split type specified by the PU split information includes the following eight patterns given that the size of the target CU is 2N×2N pixels. That is, included are four symmetric splittings of 2N×2N pixels, 2N×XN pixels, N×2N pixels, and N×N pixels and four asymmetric splittings of 2N×nU pixels, 2N×nD pixels, nL×2N pixels, and nR×2N pixels. N is equal to $2^m$ (where m is an arbitrary integer greater than or equal to one). Hereinafter, a prediction unit obtained by splitting the target CU will be referred to as a prediction block or a partition.

(Enhancement Layer)

A data structure, for example, that is approximately the same as the data structure illustrated in FIG. 3 can be employed for encoded data included in a layer representation of the enhancement layer (hereinafter, enhancement layer encoded data). In addition, additional information may be added, or parameters may be omitted in the enhancement layer encoded data as follows.

Hierarchy identification information in spatial scalability, temporal scalability, SNR scalability, and view scalability (dependency_id, temporal_id, quality_id, and view_id respectively) may be encoded in the slice layer.

The prediction type information PType included in the CU information CU is information specifying one of intra prediction, inter prediction, and inter-layer image prediction in a predicted image generation method for the target CU. The prediction type information PType includes a flag specifying whether to apply an inter-layer image prediction mode (inter-layer image prediction flag). The inter-layer image prediction flag may be referred to as texture_rl_flag, inter_layer_pred_flag, or base_mode_flag.

The enhancement layer may specify whether the type of target CU is an intra CU, an inter-layer CU, an inter CU, or a skip CU.

The intra CU can be defined in the same manner as the intra CU in the base layer. In the intra CU, the inter-layer image prediction flag is set to "0", and the prediction mode flag is set to "0".

The inter-layer CU can be defined as a CU for predicted image generation using a decoded image of the reference layer picture. In the inter-layer CU, the inter-layer image prediction flag is set to "1", and the prediction mode flag is set to "0".

The skip CU can be defined in the same manner as in the above HEVC scheme. For example, the skip flag is set to "1" in the skip CU.

The inter CU may be defined as a CU to which non-skip and motion compensation (MC) are applied. In the inter CU, for example, the skip flag is set to "0", and the prediction mode flag is set to "1".

The enhancement layer encoded data may be generated by an encoding scheme different from the encoding scheme in a lower layer as described above. That is, an encoding/decoding process in the enhancement layer is not dependent on the type of codec in a lower layer.

A lower layer may be encoded by, for example, the MPEG-2 or H.264/AVC scheme.

The enhancement layer encoded data may include parameters representing an inter-layer reference structure by extending the VPS.

The enhancement layer encoded data may include information related to a reference layer decoded image used in inter-layer image prediction (syntax for direct or indirect derivation of, for example, an inter-layer reference picture set, an inter-layer reference picture list, and base control information described later) by extending the SPS, the PPS, and the slice header.

The parameters described above may be individually encoded, or a plurality of parameters may be integrally encoded. If a plurality of parameters is integrally encoded, an index is assigned to a combination of the parameter values, and the assigned index is encoded. If a parameter can be derived from other parameters or previously decoded information, encoding of the parameter can be omitted.

[Relationship Among Picture, Tile, and Slice]

Figure 4:
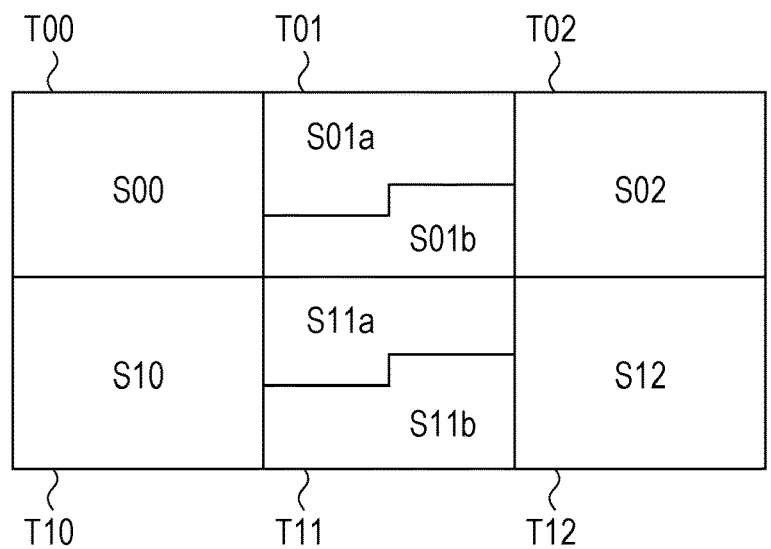
FIG. 4 is a diagram illustrating a relationship between a picture and tiles or slices in hierarchically encoded data according to one embodiment of the present invention.
Figure 4:
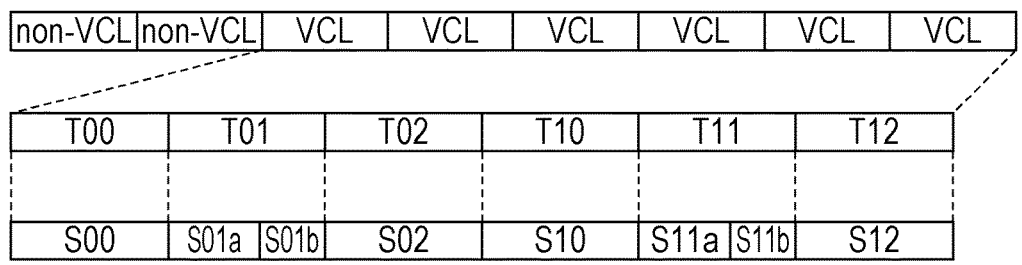

Next, regarding a picture, a tile, and a slice which are important concepts related to the present invention, a mutual relationship thereof and a relationship thereof with encoded data will be described with reference to FIG. 4. FIG. 4 is a diagram illustrating a relationship among a picture, a tile, and a slice in hierarchically encoded data. A tile is associated with a rectangular partial region in a picture and encoded data related to the partial region. A slice is associated with a partial region in a picture and encoded data related to the partial region, that is, a slice header and slice data related to the partial region.

FIG. 4(a) illustrates split regions in a case where a picture is split into tiles and slices. In FIG. 4(a), a picture is split into six rectangular tiles (T00, T01, T02, T10, T11, and T12). Each of the tile T00, the tile T02, the tile T10, and the tile T12 includes one slice (in order, a slice S00, a slice S02, a slice S10, and a slice S12). Meanwhile, the tile T01 includes two slices (a slice S01a and a slice S01b), and the tile T11 includes two slices (a slice S11a and a slice S11b).

FIG. 4(b) illustrates a relationship between tiles and slices in an encoded data configuration. First, encoded data is configured of a plurality of video coding layer (VCL) NAL units and non-VCL NAL units. Video coding layer encoded data corresponding to one picture is configured of a plurality of VCL NALs. If a picture is split into tiles, encoded data corresponding to the picture includes encoded data corresponding to the tiles in a raster order of the tiles. That is, if a picture is split into tiles as illustrated in FIG. 4(a), encoded data corresponding to the tiles in the order of the tiles T00, T01, T02, T10, T11, and T12 is included. If a tile is split into a plurality of slices, encoded data corresponding to the slices is included in the encoded data corresponding to the tile in an order from a slice of which the head CTU is positioned early in a CTU raster scan order within the tile. For example, if the tile T01 includes the slices S01a and S01b as illustrated in FIG. 4(a), encoded data corresponding to the slices is included in the encoded data corresponding to the tile T01 in the order of the slice S01a and the slice S01b.

As understood from the description thus far, encoded data corresponding to a specific tile within a picture is correlated with encoded data corresponding to one or more slices. Thus, if a decoded image of a slice correlated with a tile can be generated, a decoded image of the partial region corresponding to the tile within the picture can be generated.

Hereinafter, description will be provided on the assumption of such a relationship among a picture, a tile, a slice, and encoded data unless additional description is particularly provided.

[System Configured by Combining Decoder, Encoder, and Converter]

Figure 5:
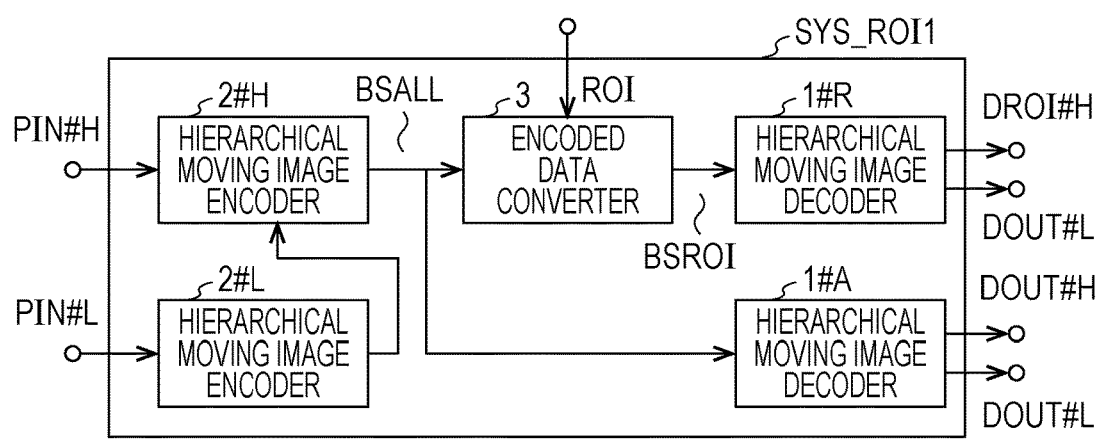
FIG. 5 is a diagram illustrating a system realized by combining a hierarchical moving image decoder, a hierarchical moving image encoder, and an encoded data converter according to the present embodiment and performing transmission and reproduction of a hierarchical moving image.

Prior to descriptions of the hierarchical moving image decoder 1, the hierarchical moving image encoder 2, and the encoded data converter 3 according to the present embodiment, an example of a system that can be realized by combining the hierarchical moving image decoder 1, the hierarchical moving image encoder 2, and the encoded data converter 3 will be described with reference to FIG. 5. FIG. 5 illustrates a system SYS_ROI1 performing transmission and reproduction of a hierarchical moving image that can be realized by combining the hierarchical moving image decoder 1, the hierarchical moving image encoder 2, and the encoded data converter 3.

The system SYS_ROI1 hierarchically encodes an input low-quality input image PIN#L and an input high-quality input image PIN#H by using a hierarchical moving image encoder 2#L and a hierarchical moving image encoder 2#H to generate hierarchically encoded data BSALL.

The hierarchically encoded data BSALL includes encoded data corresponding to the entirety of the high-quality input image PIN#H as higher layer (enhancement layer) hierarchically encoded data. In addition, the hierarchically encoded data BSALL includes encoded data corresponding to the entirety of the low-quality input image PIN#L as lower layer (base layer) hierarchically encoded data. If the hierarchically encoded data BSALL is input into the hierarchical moving image decoder 1#A, a high-quality reproduced image DOUT#H and a low-quality reproduced image DOUT#L are output.

Hierarchically encoded data BSROI is generated on the basis of an input region of interest ROI if the hierarchically encoded data BSALL is input into the encoded data converter 3. The hierarchically encoded data BSROI includes encoded data of a part of the high-quality input image PIN#H corresponding to the region of interest ROI as higher layer (enhancement layer) hierarchically encoded data. The hierarchically encoded data BSROI includes encoded data corresponding to the entirety of the low-quality input image PIN#L as lower layer (base layer) hierarchically encoded data. If the hierarchically encoded data BSROI is input into a hierarchical moving image decoder 1#R, a decoded image DROI#H corresponding to the high-quality input image PIN#H and to the region of interest ROI is output. In addition, the decoded image DOUT#L corresponding to the low-quality input image PIN#L is output.

While the hierarchical moving image decoder 1, the hierarchical moving image encoder 2, and the encoded data converter 3 may be described on the assumption of use thereof in the system SYS_ROI1, the application of each device is not necessarily limited to the system SYS_ROI1.

[Hierarchical Moving Image Decoder]

Hereinafter, a configuration of the hierarchical moving image decoder 1 according to the present embodiment will be described with reference to FIG. 1 to FIG. 20.

(Configuration of Hierarchical Moving Image Decoder)

Figure 6:
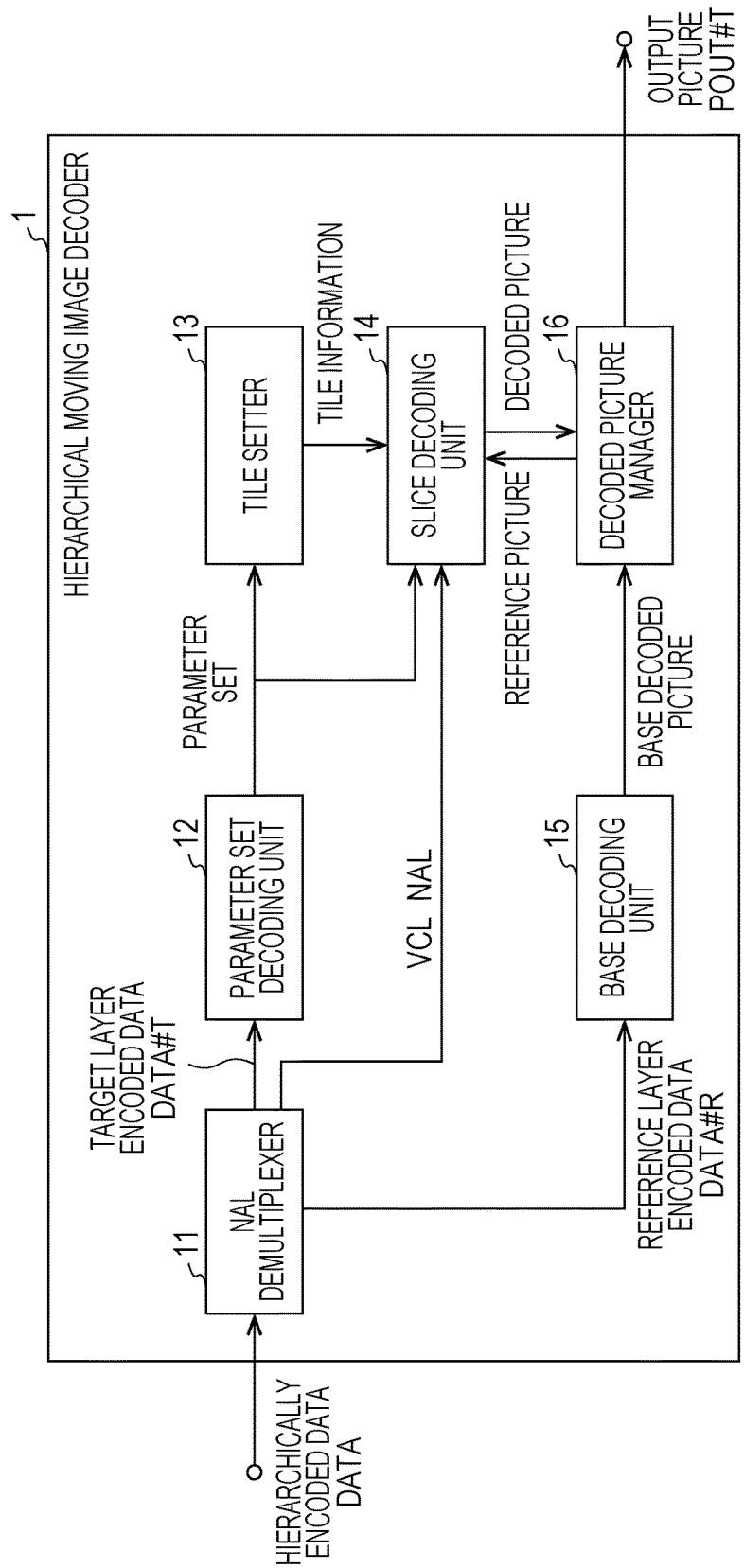
FIG. 6 is a functional block diagram illustrating a schematic configuration of the hierarchical moving image decoder.

A schematic configuration of the hierarchical moving image decoder 1 will be described as follows by using FIG. 6. FIG. 6 is a functional block diagram illustrating a schematic configuration of the hierarchical moving image decoder 1. The hierarchical moving image decoder 1 decodes hierarchically encoded data DATA (either hierarchically encoded data DATAF provided from the hierarchical moving image encoder 2 or hierarchically encoded data DATAR provided from the encoded data converter 3) to generate a target layer decoded image POUT#T. In the description below, the target layer will refer to the enhancement layer using the base layer as the reference layer. Thus, the target layer is also a higher layer for the reference layer. Conversely, the reference layer is also a lower layer for the target layer.

The hierarchical moving image decoder 1, as illustrated in FIG. 6, includes an NAL demultiplexer 11, a parameter set decoding unit 12, a tile setter 13, a slice decoding unit 14, a base decoding unit 15, and a decoded picture manager 16.

The NAL demultiplexer 11 demultiplexes the hierarchically encoded data DATA transmitted in NAL units in a network abstraction layer (NAL).

The NAL is a layer disposed to abstract communication between a video coding layer (VCL) and a lower system transmitting and storing encoded data.

The VCL is a layer in which a moving image encoding process is performed, and encoding is performed in the VCL. The lower system referred hereto corresponds to H.264/AVC and HEVC file formats or to an MPEG-2 system.

In the NAL, a bitstream generated in the VCL is divided into units called NAL units and is transmitted to the destination lower system. The NAL unit includes encoded data encoded in the VCL and a header for appropriate sending of the encoded data to the destination lower system. Encoded data in each layer is multiplexed in the NAL by storing the encoded data in the NAL unit and is transmitted to the hierarchical moving image decoder 1.

The hierarchically encoded data DATA includes an NAL including a parameter set (VPS, SPS, and PPS), SEI, and the like in addition to the NAL generated by the VCL. This NAL is referred to as a non-VCL NAL in contrast to the VCL NAL.

The NAL demultiplexer 11 demultiplexes the hierarchically encoded data DATA to acquire target layer encoded data DATA#T and reference layer encoded data DATA#R. The NAL demultiplexer 11 supplies the non-VCL NAL and the VCL NAL, of NALs included in the target layer encoded data DATA#T, respectively to the parameter set decoding unit 12 and to the slice decoding unit 14.

The parameter set decoding unit 12 decodes a parameter set, that is, the VPS, the SPS, and the PPS, from the input non-VCL NAL and supplies the parameter set to the tile setter 13 and to the slice decoding unit 14. Processing of the parameter set decoding unit 12 of high relevance to the present invention will be described in detail later.

The tile setter 13 derives tile information about a picture on the basis of the input parameter set and supplies the tile information to the slice decoding unit 14. The tile information includes at least tile split information about the picture. The tile setter 13 will be described in detail later.

The slice decoding unit 14 generates a decoded picture or a partial region of a decoded picture on the basis of the input VCL NAL, the parameter set, the tile information, and the reference picture and records the decoded picture or a partial region thereof in a buffer in the decoded picture manager 16. The slice decoding unit will be described in detail later.

The decoded picture manager 16 records the input decoded picture or a decoded base picture in an internal decoded picture buffer (DPB), generates a reference picture list, and determines an output picture. The decoded picture manager 16 outputs the decoded picture recorded in the DPB as the output picture POUT#T to an external unit at a predetermined timing.

The base decoding unit 15 decodes a base decoded picture from the reference layer encoded data DATA#R. The base decoded picture is a reference layer decoded picture used in decoding of a target layer decoded picture. The base decoding unit 15 records the decoded base decoded picture in the DPB in the decoded picture manager 16.

Figure 7:
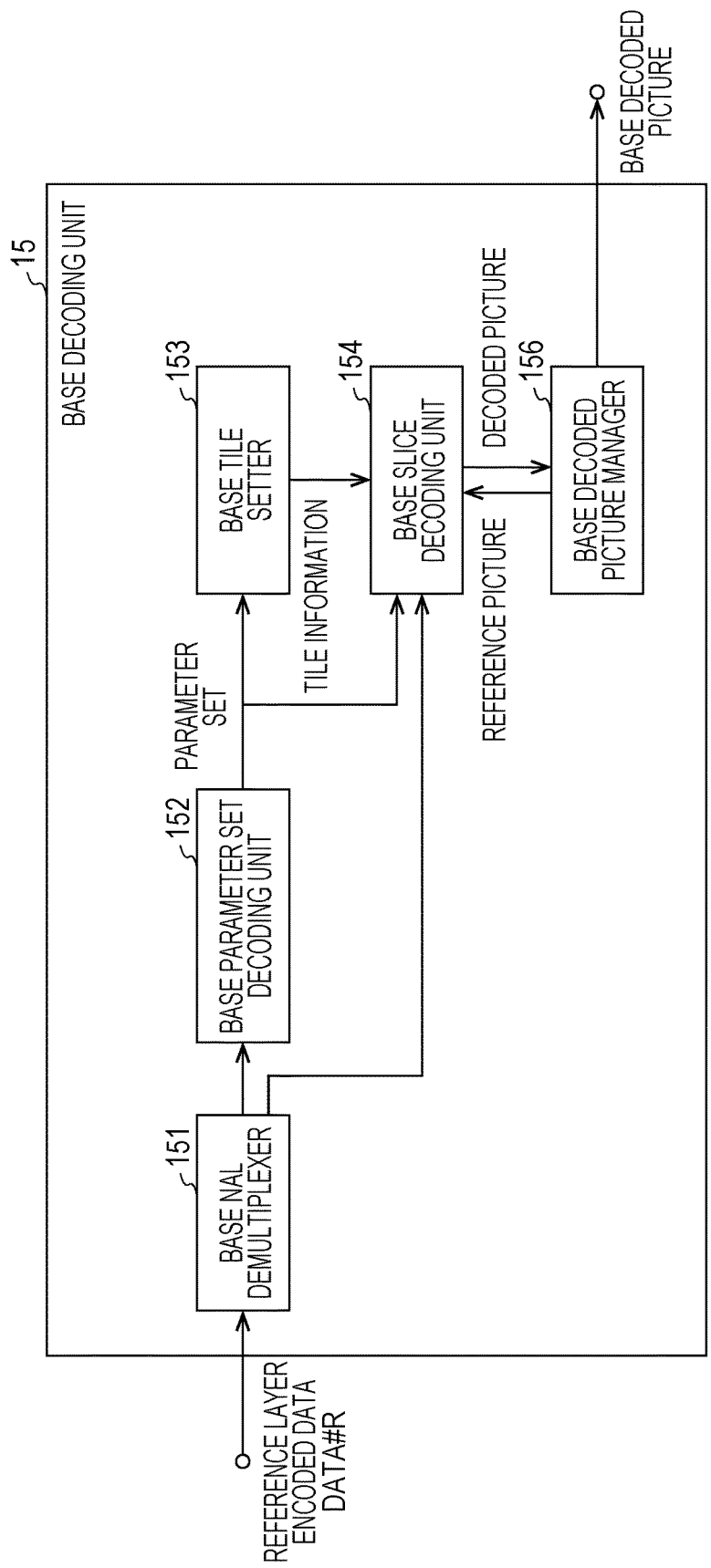
FIG. 7 is a functional block diagram illustrating a configuration of a base decoding unit included in the hierarchical moving image decoder.

A detailed configuration of the base decoding unit 15 will be described by using FIG. 7. FIG. 7 is a functional block diagram illustrating a configuration of the base decoding unit 15.

As illustrated in FIG. 7, the base decoding unit 15 includes a base NAL demultiplexer 151, a base parameter set decoding unit 152, a base tile setter 153, a base slice decoding unit 154, and a base decoded picture manager 156.

The base NAL demultiplexer 151 demultiplexes the reference layer encoded data DATA#R to extract the VCL NAL and the non-VCL NAL and supplies the non-VCL NAL and the VCL NAL respectively to the base parameter set decoding unit 152 and to the base slice decoding unit 154.

The base parameter set decoding unit 152 decodes a parameter set, that is, the VPS, the SPS, and the PPS, from the input non-VCL NAL and supplies the parameter set to the base tile setter 153 and to the base slice decoding unit 154.

The base style setter 153 derives the tile information about a picture on the basis of the input parameter set and supplies the tile information to the base slice decoding unit 154.

The base slice decoding unit 154 generates a decoded picture or a partial region of a decoded picture on the basis of the input VCL NAL, the parameter set, the tile information, and the reference picture and records the decoded picture or a partial region thereof in a buffer in the base decoded picture manager 156.

The base decoded picture manager 156 records the input decoded picture in an internal DPB, generates a reference picture list, and determines an output picture. The base decoded picture manager 156 outputs the decoded picture recorded in the DPB as a base decoded picture at a predetermined timing.

(Parameter Set Decoding Unit 12)

The parameter set decoding unit 12 decodes and outputs a parameter set (VPS, SPS, and PPS) used in decoding in the target layer from the input target layer encoded data. Generally, decoding of the parameter set is performed on the basis of a predefined syntax table. That is, a bit string is read from encoded data in accordance with a procedure defined by the syntax table, and a syntax value of the syntax included in the syntax table is decoded. If necessary, a variable derived on the basis of the decoded syntax value may be derived and included in an output parameter set. Therefore, the parameter set output from the parameter set decoding unit 12 can be represented as a set of the syntax value of the syntax related to the parameter set (VPS, SPS, and PPS) included in the encoded data and the variable derived from the syntax value.

Hereinafter, of the syntax table used in decoding in the parameter set decoding unit 12, picture information that is of high relevance to the present invention and a part of the syntax table related to inter-layer position correspondence information will be described in detail.

(Picture Information)

The parameter set decoding unit 12 decodes the picture information from the input target layer encoded data. The picture information is, schematically, information defining the size of the target layer decoded picture. For example, the picture information includes information representing the width and the height of the target layer decoded picture.

The picture information is included in, for example, the SPS, and is decoded in accordance with the syntax table illustrated in FIG. 8. FIG. 8 is a part of the syntax table referenced by the parameter set decoding unit 12 in SPS decoding and related to display region information.

The picture information decoded from the SPS includes the width of the decoded picture (pic_width_in_luma_samples) and the height of the decoded picture (pic_height_in_luma_samples). The value of the syntax pic_width_in_luma_samples corresponds to the width of the decoded picture in units of luma pixels. The value of the syntax pic_height_in_luma_samples corresponds to the height of the decoded picture in units of luma pixels.

(Display Region Information)

The parameter set decoding unit 12 decodes the display region information from the input target layer encoded data. The display region information is included in, for example, the SPS and is decoded in accordance with the syntax table illustrated in FIG. 9. FIG. 9 is a part of the syntax table referenced by the parameter set decoding unit 12 in SPS decoding and related to the display region information.

The display region information decoded from the SPS includes a display region flag (conformance flag). The display region flag indicates whether information representing the position of a display region (display region position information) is additionally included in the SPS. That is, if the display region flag is equal to one, this indicates additional inclusion of the display region position information, and if the display region flag is equal to zero, this indicates no additional inclusion of the display region position information.

The display region information decoded from the SPS, if the display region flag is equal to one, further includes a display region left offset (conf_win_left_offset), a display region right offset (conf_win_right_offset), a display region top offset (conf_win_top_offset), and a display region bottom offset (conf_win_bottom_offset) as the display region position information.

The display region is set to the entire picture if the display region flag is equal to zero. Meanwhile, if the display region flag is equal to one, the display region is set to a partial region in the picture indicated by the display region position information. The display region is referred to as a conformance window.

Figure 10:
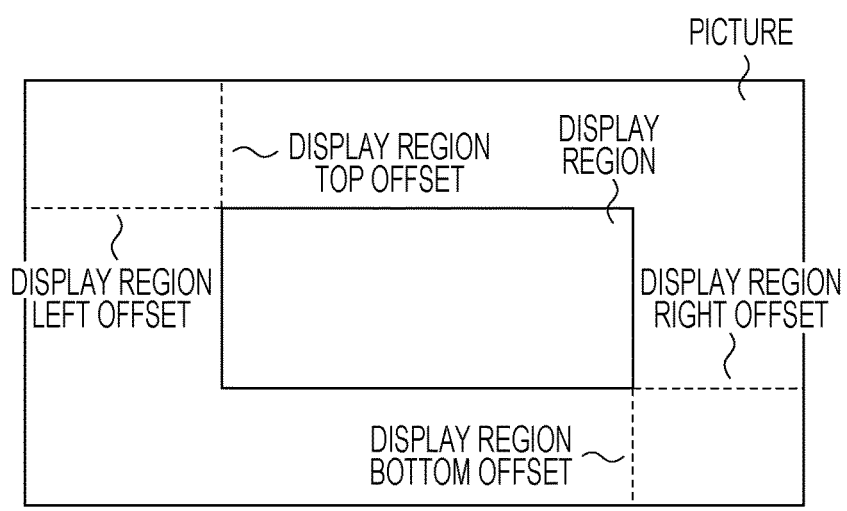
FIG. 10 is a diagram illustrating a relationship between display region position information and a display region corresponding to a partial region in a picture.

A relationship between the display region position information and the display region will be described with reference to FIG. 10. FIG. 10 is a diagram illustrating a relationship between the display region corresponding to a partial region in the picture and the display region position information. As illustrated in the drawing, the display region is included in the picture. The display region top offset represents the distance between the top edge of the picture and the top edge of the display region. The display region left offset represents the distance between the left edge of the picture and the left edge of the display region. The display region right offset represents the distance between the right edge of the picture and the right edge of the display region.

The display region bottom offset represents the distance between the bottom edge of the picture and the bottom edge of the display region. Therefore, the position and the size of the display region in the picture can be uniquely specified by the display region position information. The display region information may be other information allowing unique specification of the position and the size of the display region in the picture.

(Inter-Layer Position Correspondence Information)

The parameter set decoding unit 12 decodes the inter-layer position correspondence information from the input target layer encoded data. The inter-layer position correspondence information indicates, schematically, a positional relationship between corresponding regions in the target layer and in the reference layer. For example, if an object (object A) is included in the target layer picture and in the reference layer picture, the corresponding regions in the target layer and in the reference layer mean a region corresponding to the object A on the target layer picture and a region corresponding to the object A on the reference layer picture. The inter-layer position correspondence information may not necessarily be information indicating an accurate positional relationship between the corresponding regions in the target layer and in the reference layer but, in general, indicates an accurate positional relationship between the corresponding regions in the target layer and in the reference layer in order to increase the accuracy of inter-layer prediction.

The inter-layer position correspondence information includes inter-layer pixel correspondence information and inter-layer phase correspondence information. The inter-layer pixel correspondence information is information indicating a positional relationship between a pixel on the reference layer picture and the corresponding pixel on the target layer picture. The inter-layer phase correspondence information is information representing a phase difference between the corresponding pixels indicated by the inter-layer pixel correspondence information.

(Inter-Layer Pixel Correspondence Information)

The inter-layer pixel correspondence information is included in, for example, an SPS extension (sps_extension) corresponding to a part of the higher layer SPS and is decoded in accordance with the syntax table illustrated in FIG. 11. FIG. 11 is a part of the syntax table referenced by the parameter set decoding unit 12 in SPS decoding and related to the inter-layer pixel correspondence information.

The inter-layer pixel correspondence information decoded from the SPS includes the number of pieces of inter-layer pixel correspondence information (num_scaled_ref_layer_offsets) included in the SPS extension. In addition, the inter-layer pixel correspondence information includes inter-layer pixel correspondence offsets in number corresponding to the number of pieces of inter-layer pixel correspondence information. An inter-layer pixel correspondence offset includes a scaled reference layer left offset (scaled_ref_layer_left_offset[i]), a scaled reference layer top offset (scaled_ref_layer_top_offset[i]), a scaled reference layer right offset (scaled_ref_layer_right_offset[i]), and a scaled reference layer bottom offset (scaled_ref_layer_bottom_offset[i]).

Figure 12:
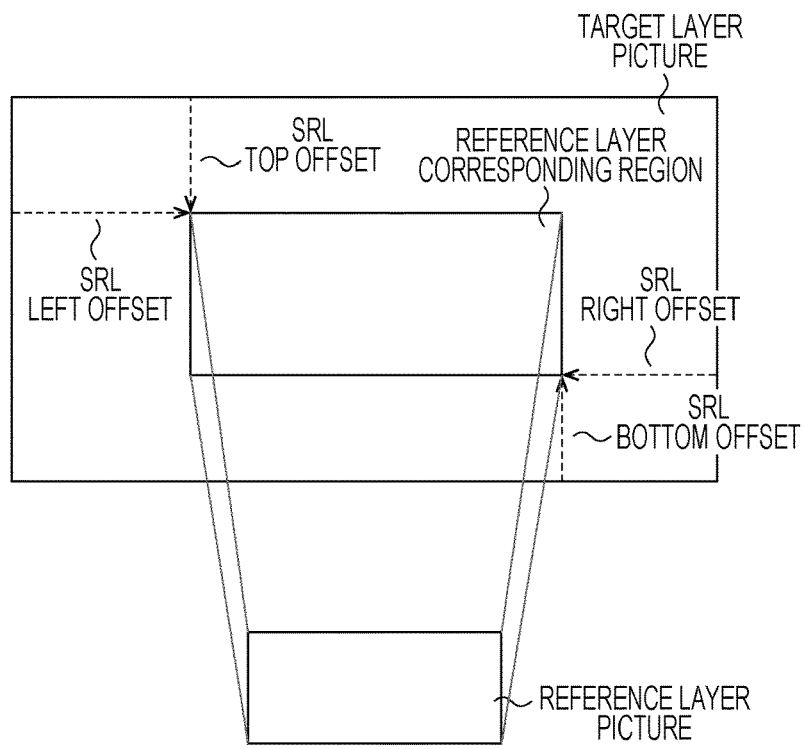
FIG. 12 is a diagram illustrating a relationship among a target layer picture, a reference layer picture, and an inter-layer pixel correspondence offset.
Figure 12:
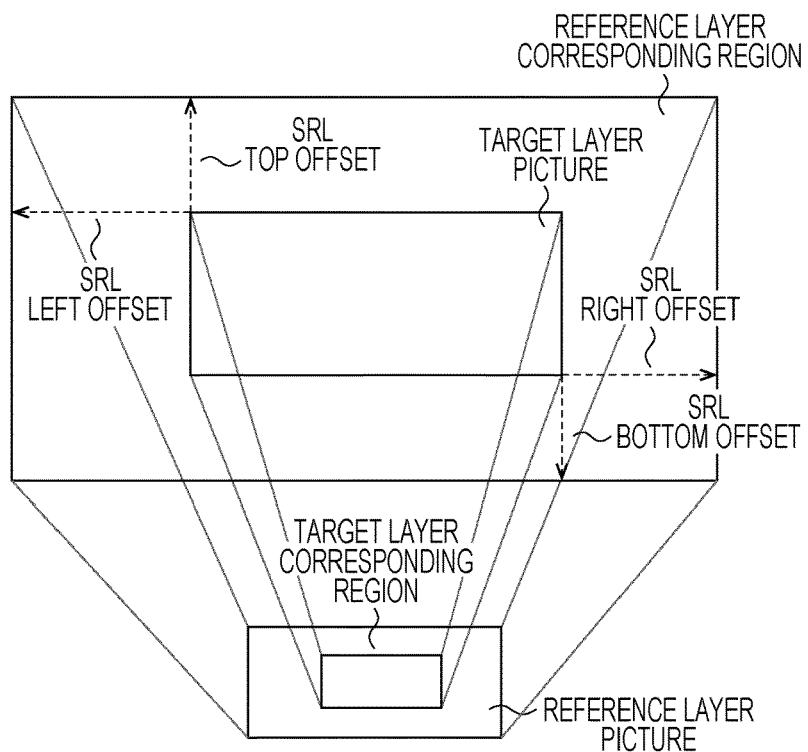

The meaning of each offset included in the inter-layer pixel correspondence offset will be described with reference to FIG. 12. FIG. 12 is a diagram illustrating a relationship among the target layer picture, the reference layer picture, and the inter-layer pixel correspondence offset.

FIG. 12(a) illustrates a case where the entire reference layer picture corresponds to a part of the target layer picture. In this case, the region on the target layer corresponding to the entire reference layer picture (target layer corresponding region) is included in the target layer picture. FIG. 12(b) illustrates a case where a part of the reference layer picture corresponds to the entire target layer picture. In this case, the target layer picture is included in a reference layer corresponding region. The offset is included in the entire target layer picture.

As illustrated in FIG. 12, the scaled reference layer left offset (SRL left offset in the drawing) represents the offset of the left edge of the reference layer target region from the left edge of the target layer picture. If the SRL left offset is greater than zero, this indicates that the left edge of the reference layer target region is positioned on the right side of the left edge of the target layer picture.

The scaled reference layer top offset (SRL top offset in the drawing) represents the offset of the top edge of the reference layer target region from the top edge of the target layer picture. If the SRL top offset is greater than zero, this indicates that the top edge of the reference layer target region is positioned on the lower side of the top edge of the target layer picture.

The scaled reference layer right offset (SRL right offset in the drawing) represents the offset of the right edge of the reference layer target region from the right edge of the target layer picture. If the SRL right offset is greater than zero, this indicates that the right edge of the reference layer target region is positioned on the left side of the right edge of the target layer picture.

The scaled reference layer bottom offset (SRL bottom offset in the drawing) represents the offset of the bottom edge of the reference layer target region from the bottom edge of the target layer picture. If the SRL bottom offset is greater than zero, this indicates that the bottom edge of the reference layer target region is positioned on the upper side of the bottom edge of the target layer picture.

(Inter-Layer Phase Correspondence Information)

The inter-layer phase correspondence information is included in, for example, the SPS extension corresponding to a part of the higher layer SPS and is decoded in accordance with the syntax table illustrated in FIG. 13. FIG. 13 is a part of the syntax table referenced by the parameter set decoding unit 12 in SPS decoding and related to the inter-layer phase correspondence information.

The inter-layer phase correspondence information decoded from the SPS includes the number of reference layer phase offsets (num_ref_layer_phase_offsets). In addition, the inter-layer phase correspondence information includes reference layer phase offsets in number corresponding to the number of reference layer phase offsets. The reference layer phase offset is represented by a combination of a left phase offset (ref_layer_left_phase_offset) and a top phase offset (ref_layer_top_phase_offset).

The left phase offset represents a phase offset in the horizontal direction between the upper left pixel of the reference layer corresponding region and the upper left pixel of the reference layer picture. Similarly, the top phase offset represents a phase offset in the vertical direction between the upper left pixel of the reference layer corresponding region and the upper left pixel of the reference layer picture.

The upper left pixel of the reference layer corresponding region is a pixel within the target layer picture. The phase offset between a pixel within the target layer picture (target layer pixel) and a pixel within the reference layer picture (reference layer pixel) is an amount representing a shift, smaller than a unit pixel in size, of a point on the target layer corresponding to a reference layer pixel from the target layer pixel corresponding to the reference layer pixel.

Figure 14:
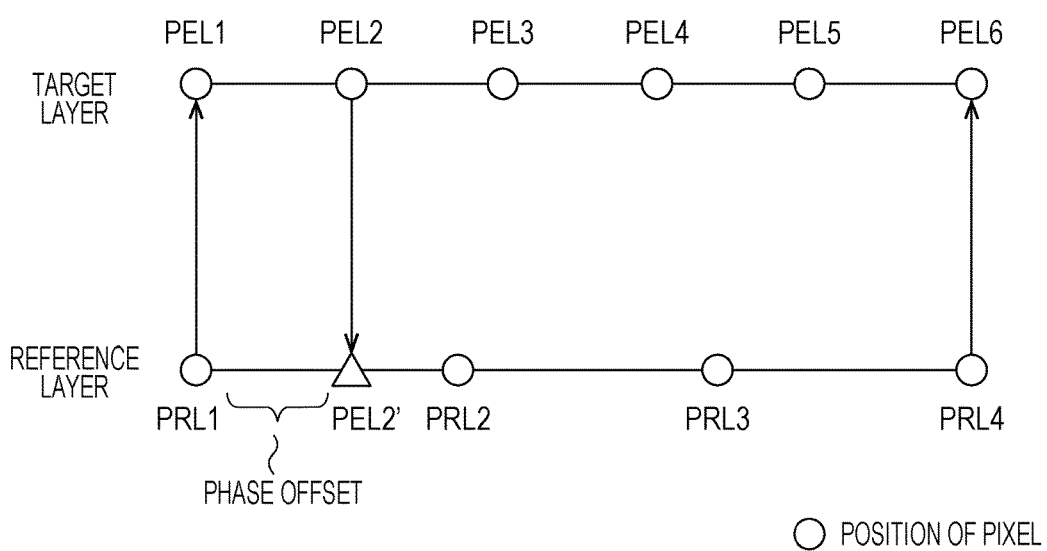
FIG. 14 is a diagram illustrating a relationship in correspondence and phase difference between target layer pixels and reference layer pixels.

An example of a phase difference between a target layer pixel and a reference layer pixel will be described with reference to FIG. 14. FIG. 14 is a diagram illustrating a relationship between correspondence of target layer pixels and reference layer pixels and a phase difference. In FIG. 14, a part of the reference layer picture and the reference layer corresponding region on the corresponding target layer are represented in one dimension (dimension corresponding to either the horizontal direction or the vertical direction) in a case of using spatial scalability at a magnification of 1.5, and six pixels (PEL1, PEL2, PEL3, PEL4, PEL5, and PEL6 in order from left) on the target layer and four pixels (PRL1, PRL2, PRL3, and PRL4 in order from left) on the reference layer are illustrated. The pixel PEL1 and the pixel PRL1 are at a corresponding position, and the pixel PEL6 and the pixel PRL4 are at a corresponding position. In this case, a phase offset of the pixel PEL2, for example, is a shift between a point PEL2' on the reference layer corresponding to the pixel PEL2 and the position of a reference layer pixel (pixel PEL1) corresponding to the pixel PEL2. In the example of the drawing, the phase offset of the pixel PEL2 is ⅗ of a unit pixel of the reference layer. Generally, given that the position of a reference layer pixel corresponding to a target layer pixel PEL is Int(PEL), a phase offset of the target layer pixel PEL is PhaseEL, and the position of a point on the reference layer corresponding to the target layer pixel is PEL', the following relationship is established.

Int(PEL)+PhaseEL=PEL'

That is, a value resulting from adding the phase offset to the position of the reference layer pixel corresponding to the target layer pixel PEL matches the position of the point on the reference layer corresponding to the target layer pixel.

It is not necessary to include a precise value of the reference layer phase offset in the parameter set, and an approximate value may be included. In addition, it is not necessary for the unit of the reference layer phase offset to be the same as the unit pixel of the reference layer. For example, a value resulting from approximating a value represented in units of 16 reference layer pixels to integer precision may be used as the reference layer phase offset.
(Inter-Layer Phase Correspondence Information 2)

While the reference layer phase offset is directly included in the SPS in the above example described with reference to FIG. 13, the present embodiment is not limited to this. For example, other parameter sets allowing derivation of the reference layer phase offset may be included. Such an example will be described with reference to the syntax table illustrated in FIG. 15. FIG. 15 is another example of a part of the syntax table referenced by the parameter set decoding unit 12 in SPS decoding and related to the inter-layer phase correspondence information.

In this example, the inter-layer phase correspondence information decoded from the SPS includes the number of reference layer crop offsets (num_cropped_ref_layer_offsets). In addition, the inter-layer phase correspondence information includes reference layer phase offsets in number corresponding to the number of reference layer crop offsets. The reference layer phase offset is represented by a combination of a left crop offset (cropped_ref_layer_left_offset) and a top crop offset (cropped_ref_layer_top_offset).

The left crop offset represents a positional shift in the horizontal direction of the upper left pixel of the reference layer corresponding region from a reference target layer pixel. The reference target layer pixel is a pixel positioned at the upper left (at a horizontally matching position or left and at a vertically matching position or above) of the upper left pixel of the reference layer corresponding region and is a pixel of which the position of the corresponding point on the reference layer is equal to an integer position in units of pixels on the reference layer. For example, in the example of FIG. 14, the pixel PEL1 can be used as the reference target layer pixel of the pixel PEL2. Similarly, the top crop offset represents a positional shift in the vertical direction of the upper left pixel of the reference layer corresponding region from the reference target layer pixel.

The reason that information corresponding to the reference layer phase offset can be derived from the reference layer crop offset is as follows.

Given that the position of a reference layer pixel corresponding to a target layer upper left pixel PELTL is Int(PELTL), a phase offset of the target layer pixel PELTL is PhaseELTL, a reference target layer pixel is PELBASE, and a pixel on the reference layer corresponding to the reference target layer pixel PELBASE is Int(PELBASE), the following relationship is established.

scale*(PELTL−PELBASE)=PhaseELTL+Int(PELTL)−Int(PELBASE)

A magnification in spatial scalability is denoted by scale, and a region resulting from enlarging the reference layer picture at the magnification indicated by scale corresponds to the reference layer corresponding region.

That is, a value resulting from multiplying the distance between the pixel PELBTL and the pixel PELBASE on the target layer by the magnification in spatial scalability matches a value resulting from adding the phase offset to the distance between a pixel corresponding to the pixel PELTL and a pixel corresponding to the pixel PELBASE on the reference layer. From this relationship, the phase offset PhaseELTL can be derived on the basis of the position of the pixel PELBASE. The relationship is established because a point PELBASE' on the reference layer corresponding to the pixel PELBASE on the target layer matches the pixel Int(PELBASE) on the reference layer corresponding to the pixel PELBASE.
(Tile Setter 13)

The tile setter 13 derives and outputs the tile information about a picture on the basis of the input parameter set.

In the present embodiment, the tile information generated by the tile setter 13 includes, schematically, tile structure information and tile dependency information.

The tile structure information is information indicating the number of tiles within a picture and the size of each tile. If a tile is associated with a partial region obtained by splitting a picture into a lattice, the number of tiles within the picture is equal to the product of the number of tiles included in the horizontal direction and the number of tiles included in the vertical direction.

The tile dependency information is information indicating dependency in tile decoding in the picture. The dependency in tile decoding indicates the degree to which a tile is dependent on a decoded pixel or a syntax value related to a region outside of the tile. The region outside of the tile includes a region outside of the tile on the target picture, a region outside of the tile on the reference picture, and a region outside of the tile on the base decoded picture.

Hereinafter, details of the tile information generated by the tile setter 13 will be described including a derivation process based on the input parameter set.

The tile information is derived on the basis of a syntax value related to the tile information and included in the SPS or the PPS included in the parameter set. The syntax related to the tile information will be described with reference to FIG. 16.

(PPS Tile Information)

FIG. 16 is a part of the syntax table referenced by the parameter decoding unit 12 in decoding of the PPS included in the parameter set and related to the tile information.

The syntax (PPS tile information) included in the PPS and related to the tile information includes plural tiles validity flag (tiles enabled flag). If the value of the plural tiles validity flag is one, this indicates that a picture is configured of two or more tiles. If the value of the flag is zero, this indicates that a picture is configured of one tile, that is, a picture matches a tile.

If use of plural tiles is valid (tiles enabled flag is equal to true), the PPS tile information additionally includes information indicating the number of tile columns (num_tile_columns_minus1), information indicating the number of tile rows (num_tiles_rows_minus1), and a flag indicating uniformity of a tile size (uniform_spacing_flag).

The syntax num_tile_columns_minus1 corresponds to a value resulting from subtracting one from the number of tiles of a picture included in the horizontal direction. The syntax num_tile_rows_minus1 corresponds to a value resulting from subtracting one from the number of tiles of a picture included in the vertical direction. Therefore, a number NumTilesInPic of tiles included in a picture is calculated by the following equation.

$$NumTilesInPic=(num\_tile\_columns\_minus1+1)*(num\_tile\_rows\_minus1+1)$$

If the value of uniform_spacing_flag is one, this indicates that the sizes of tiles included in a picture are uniform, that is, the width and the height of each tile are equal. If the value of uniform_spacing_flag is zero, this indicates that the sizes of tiles included in a picture are not uniform, that is, the widths or heights of tiles included in a picture do not necessarily match.

If the sizes of tiles included in a picture are not uniform (uniform_spacing_flag is equal to zero), the PPS tile information additionally includes information indicating a tile width for each tile column included in the picture (column_width_minus1[i]) and information indicating a tile height for each tile row included in the picture (row_height_minus1[i]).

If use of plural tiles is valid, the PPS tile information additionally includes a flag indicating whether to apply a loop filter across a tile boundary (loop_filter_across_tiles_enabled_flag).

A relationship among a tile row, a tile column, and a picture will be described with reference to FIG. 17. FIG. 17 is a diagram illustrating tile rows and tile columns in a case where a picture is split into tiles. In the example of FIG. 17, the picture is split into four tile columns and three tile rows and includes total 12 tiles. For example, a tile column 0 (TileCol0) includes tiles T00, T10, and T20. For example, a tile row 0 (TileRow0) includes tiles T00, T01, T02, and T03. The width of a tile column i is represented as ColWidth[i] in units of CTUs. The height of a tile row j is represented as RowHeight[j] in units of CTUs. Therefore, the width of a tile belonging to the tile row i and to the tile column j is denoted by ColWidth[i], and the height thereof is denoted by RowHeight[j].

The tile setter 13 derives the tile structure information on the basis of the PPS tile information. The tile structure information includes an array for derivation of a tile scan CTB address from a raster scan CTB address (CtbAddrRsToTs[ctbAddrRs]), an array for derivation of a raster scan CTB address from a tile scan CTB address (CtbAddrTsToRs[ctbAddrTs]), a tile identifier for each tile scan CTB address (TileId[ctbAddrTs]), the width of each tile column (ColumnWidthInLumaSamples[i]), and the height of each tile row (RowHeightInLumaSamples[j]).

If uniform spacing flag is equal to one, the width of each tile column is calculated on the basis of the size of a picture and the number of tiles within the picture. For example, the width of an i-th tile column (ColumnWidthInLumaSamples[i]) is calculated by the following equation. PicWidthInCtbsY represents the number of CTUs of a picture included in the horizontal direction.

$$ColWidth[i]=((i+1)*PicWidthInCtbsY)/(num\_tile\_columns\_minus1+1)-(i*PicWidthInCtbsY)/(num\_tile\_columns\_minus1+1)$$

That is, the width of the i-th tile column ColWidth[i] is calculated in units of CTUs as the difference between (i+1)-th and i-th boundary positions obtained by equally dividing the picture into tile columns.

Meanwhile, if uniform_spacing_flag is equal to zero, the width of the i-th tile column ColWidth[i] in units of CTUs is set to the value of (column_width_minus1[i]+1).

The value of ColumnWidthInLumaSamples[i] is set to a value obtained by multiplying ColWidth[i] by the width of the CTU in units of pixels.

The height of a tile row RowHeight[j] is calculated in units of CTUs by the same method as the width of a tile column. PicHeightInCtbsY (number of CTUs of the picture included in the vertical direction), num_tiles_row_minus1, and row_height_minus1[i] are respectively used instead of PicWidthInCtbsY, num_tiles_columns_minus1, and column_width_minus1[i].

The value of RowHeightInLumaSamples[j] is set to a value obtained by multiplying RowHeight[j] by the height of the CTU in units of pixels.

Next, a derivation method for the array (CtbAddrTsToRs[ctbAddrTs]) for derivation of a raster scan CTB address from a tile scan CTB address will be described.

First, colBd[i] that indicates the boundary position of the i-th tile column and rowBd[j] that indicates the boundary position of the j-th tile row are calculated by the following equations. The values of colBd[0] and rowBd[0] are zero.

$$colBd[i+1]=colBd[i]+colWidth[i]$$

$$rowBd[j+1]=rowBd[j]+rowHeight[j]$$

Next, a tile scan CTU address that is correlated with the CTU identified by a raster scan CTU address (ctbAddrRs) and included in the picture is derived in the following procedure.

The position (tbX, tbY) of the target CTU within the picture is calculated in units of CTUs by the following equations from ctbAddrRs. The operator "%" is a modulo operator, and "A % B" means the remainder after division of the integer A by the integer B.

$$tbX=ctbAddrRs \% PicWidthInCtbsY$$

$$tbY=ctbAddrRs/PicWidthInCtbsY$$

Next, the position (tileX, tileY) of a tile including the target CTU within the picture is derived in units of tiles. The maximum value of i at which the evaluation expression (tbX>=colBd[i]) is true is set to tileX. Similarly, the maximum value of j at which the evaluation expression (tbY>=rowBd[j]) is true is set to tileY.

The value of CtbAddrRsToTs[ctbAddrRs] is set to a value resulting from adding the sum of CTUs included in the tile preceding the tile (tileX, tileY) in a tile scan order to the position in the raster scan order within the tile of the CTU positioned at (tbX−colBd[tileX], tbY−rowBd[tileY]) within the tile (tileX, tileY).

The value of CtbAddrTsToRs[ctbAddrTs] is set to the value of k in a case where CtbAddrRsToTs[k] matches ctbAddrTs.

The value of TileId[ctbAddrTs] is set to the tile identifier of the tile to which the CTU indicated by ctbAddrTs belongs. A tile identifier tileId(tileX, tileY) of the tile positioned at (tileX, tileY) in units of tiles within the picture is calculated by the following equation.

tileId(tileX, tileY)=(tileY*(num_tile_cols_minus1+1))+tileX (Slice Decoding Unit 14)

The slice decoding unit 14 generates and outputs a decoded picture on the basis of the input VCL NAL, the parameter set, and the tile information.

Figure 18:
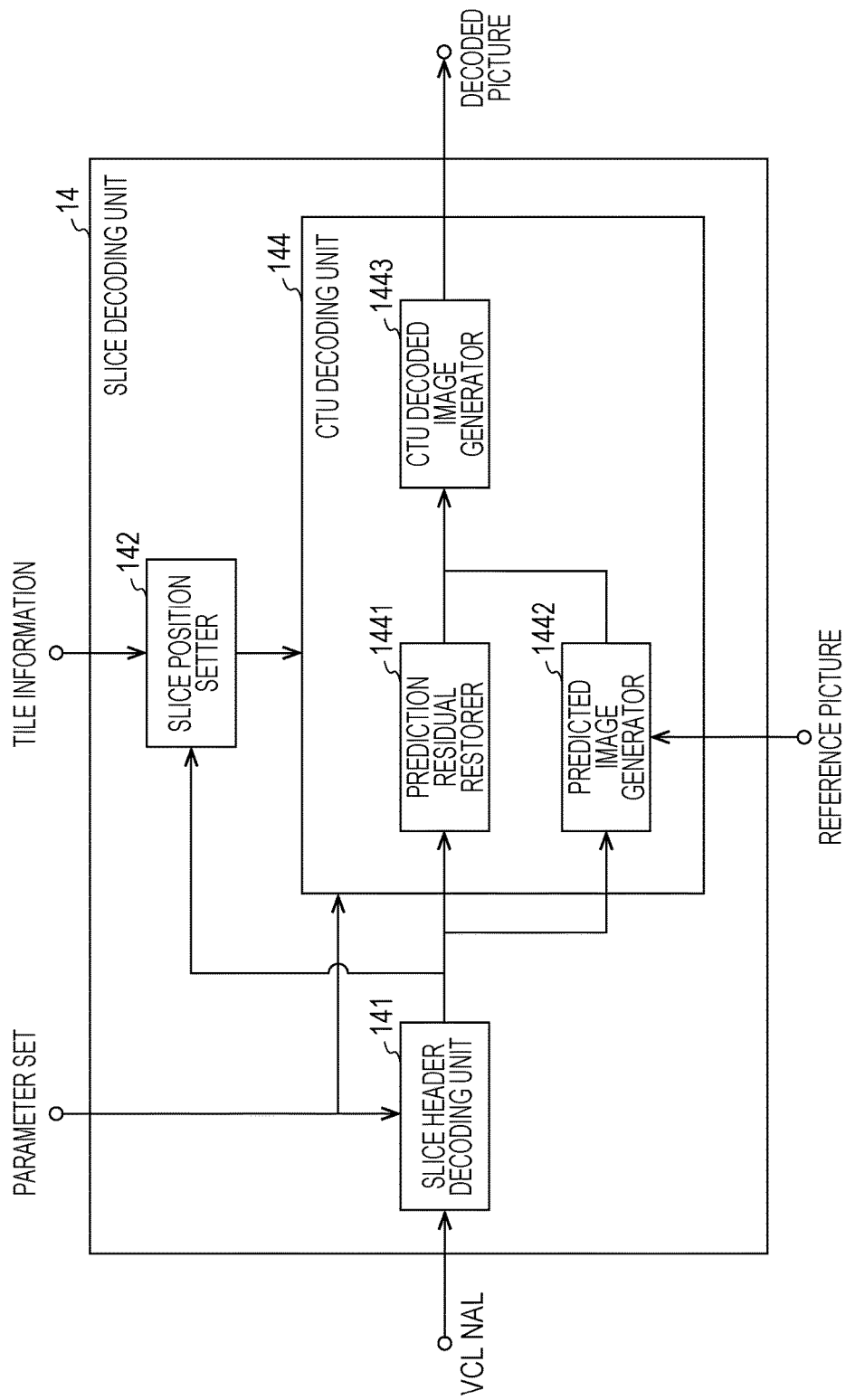
FIG. 18 is a functional block diagram illustrating a configuration of a slice decoding unit included in the hierarchical moving image decoder.

A schematic configuration of the slice decoding unit 14 will be described by using FIG. 18. FIG. 18 is a functional block diagram illustrating a schematic configuration of the slice decoding unit 14.

The slice decoding unit 14 includes a slice header decoding unit 141, a slice position setter 142, and a CTU decoding unit 144. The CTU decoding unit 144 includes a prediction residual restorer 1441, a predicted image generator 1442, and a CTU decoded image generator 1443.

(Slice Header Decoding Unit)

The slice header decoding unit 141 decodes the slice header on the basis of the input VCL NAL and the parameter set and outputs the slice header to the slice position setter 142 and to the CTU decoding unit 144.

The slice header includes information related to the position of a slice within a picture (SH slice position information). Hereinafter, a syntax table referenced by the slice header decoding unit 141 in slice header decoding will be illustratively described.

FIG. 19 is a part of the syntax table referenced by the slice header decoding unit 141 in slice header decoding and related to the slice position information.

The slice header includes an in-picture head slice flag (first_slice_segment_in_pic_flag) as the slice position information. If the in-picture head slice flag is equal to one, this indicates that the target slice is positioned at the head in a decoding order within a picture. If the in-picture head slice flag is equal to zero, this indicates that the target slice is not positioned at the head in the decoding order within the picture.

The slice header includes a slice PPS identifier (slice_pic_parameter_set_id) as the slice position information. The slice PPS identifier is an identifier of the PPS correlated with the target slice, and the tile information that is to be correlated with the target slice is specified by the PPS identifier.

(Slice Position Setter)

The slice position setter 142 specifies the position of a slice within a picture on the basis of the input slice header and the tile information and outputs the position of a slice to the CTU decoding unit 144.

Given that the position of the i-th CTU of a slice within a picture is (ctbX[i], ctbY[i]) in units of CTUs and that a tile scan address is ctbAddrTs[i], the position (ctbX[0], ctbY[0]) of the head CTU of the slice, that is, the zeroth CTU, within the picture and the tile scan address ctbAddrTs are calculated by the following equations.

ctbAddrTs[0]=CtbAddrRsToTs[slice_segment_address]

ctbX[0]=slice segment address % PicWidthInCtbsY ctbY[0]=slice segment address/PicWidthInCtbsY CtbAddrRsToTs[X] is an array for transformation of a raster scan address into a tile scan address and is included in the tile information that is input into the slice position setter.

The position (ctbX[i], ctbY[i]) of the i-th (i>0) CTU of the slice within the picture is calculated by the following equations.

ctbAddrTs[i]=ctbAddrTs[i−1]+1 ctbX[i]=CtbAddrTsToRs[ctbAddrTs[i]]%PicWidthInCtbsY ctbY[i]=CtbAddrTsToRs[ctbAddrTs[i]]/PicWidthInCtbsY That is, the tile scan address of the target CTU is set to a value resulting from adding one to the tile scan address of the immediately preceding CTU. The tile scan address obtained is transformed into a raster scan address by using the transformation array CtbAddrTsToRs included in the tile information. The position (ctbX[i], ctbY[i]) of the CTU within the picture is derived by using the raster scan address and the width of the picture in units of CTUs.

Calculation of the position (ctbXInLumaPixels[i], ctbYInLumaPixels[i]) of the CTU within the picture from (ctbX[i], ctbY[i]) in units of luma pixels may be performed by multiplying each element of (ctbX[i], ctbY[i]) by the size of the CTU. For example, the following calculation can be performed by using CtbLog2SizeY that corresponds to the logarithm to the base two of the width of the CTU in units of luma pixels.

ctbXInLumaPixels[i]=ctbX[i]<<CtbLog2SizeY ctbYInLumaPixels[i]=ctbY[i]<<CtbLog2SizeY By the process thus far, the slice position setter 142 calculates and outputs the position within the picture of each CTU included in the slice.

(CTU Decoding Unit)

The CTU decoding unit 144 decodes a decoded image of a region corresponding to each CTU included in the slice on the basis of, schematically, the input slice header, the slice data, and the parameter set to generate a decoded image of the slice. The decoded image of the slice is output as a part of the decoded picture at the position indicated by the input position of the slice. The decoded image of the CTU is generated by the prediction residual restorer 1441, the predicted image generator 1442, and the CTU decoded image generator 1443 included in the CTU decoding unit 144. The prediction residual restorer 1441 decodes prediction residual information (TT information) included in the input slice data to generate and output a prediction residual of the target CTU. The predicted image generator 1442 generates and outputs a predicted image on the basis of a prediction parameter and a prediction method indicated by the prediction information (PT information) included in the input slice data. At this time, if necessary, the decoded image of the reference picture or the encoding parameters are used. The CTU decoded image generator 1443 adds the input predicted image and the prediction residual to generate and output the decoded image of the target CTU.

(Details of Predicted Image Generator)

A predicted image generation process, of the above predicted image generation process performed by the predicted image generator 1442, in a case where inter-layer image prediction is selected will be described in detail.

A process of generating a predicted pixel value of a target pixel included in the target CTU to which inter-layer image prediction is applied is performed in the following procedure. First, a reference picture position derivation process is performed to derive a corresponding reference position. A corresponding reference position is a position on the reference layer corresponding to the target pixel on the target layer picture. Since the pixels of the target layer do not necessarily correspond one-to-one to the pixels of the reference layer, the corresponding reference position is represented with an accuracy smaller than the unit pixel in size in the reference layer. Next, an interpolation filtering process is performed with input of the derived corresponding reference position to generate a predicted pixel value of the target pixel.

Figure 1:
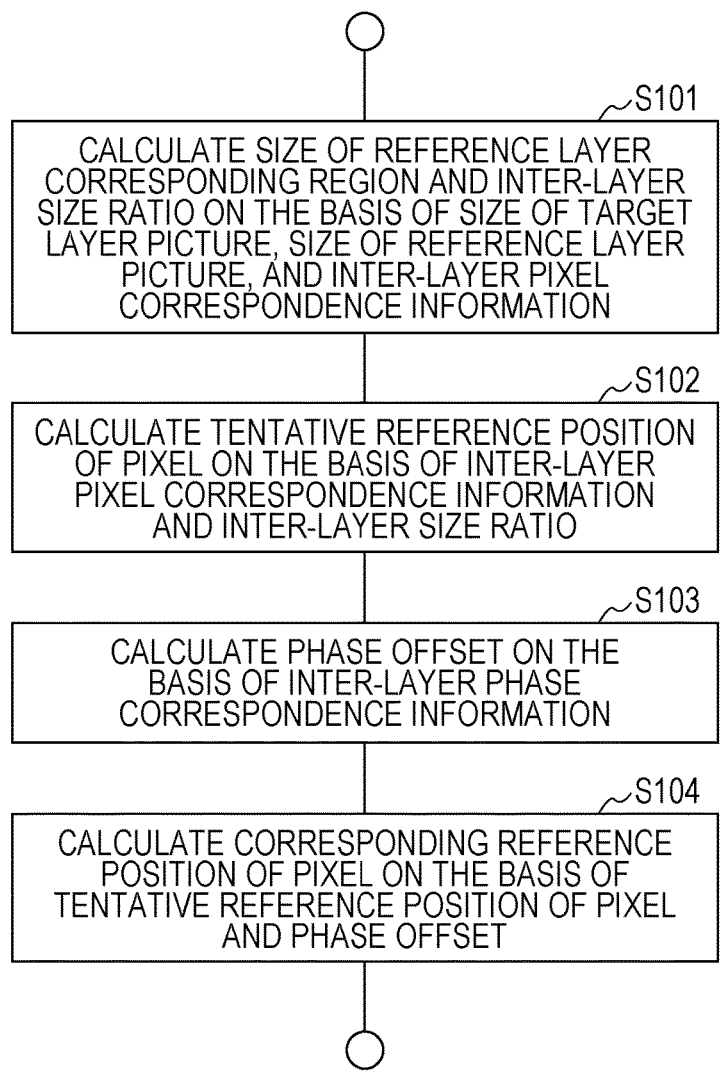
FIG. 1 is a flowchart illustrating a corresponding reference position derivation process.

A corresponding reference position derivation process derives the corresponding reference position on the basis of the picture information, the inter-layer pixel correspondence information, and the inter-layer phase correspondence information included in the parameter set. A detailed procedure of the corresponding reference position derivation process will be described with reference to FIG. 1. FIG. 1 is a flowchart illustrating the corresponding reference position derivation process. The corresponding reference position derivation process is realized by performing the following processes of S101 to S104 in order.

(S101) The size of the reference layer corresponding region and an inter-layer size ratio (ratio of the size of the reference layer picture to the size of the reference layer corresponding region) are calculated on the basis of the size of the target layer picture, the size of the reference layer picture, and the inter-layer pixel correspondence information. First, a width SRLW and a height SRLH of the reference layer corresponding region and a horizontal component scaleX and a horizontal component scaleY of the inter-layer size ratio are calculated by the following equations.

$$SRLW = currPicW - SRLLeftOffset - SRLRightOffset$$

$$SRLH = currPicH - SRLTopOffset - SRLBottomOffset$$

$$scaleX = refPicW \div SRLW$$

$$scaleY = refPicH \div SRLH$$

currPicW and currPicH denote the width and the height of the target picture and, if the target of the corresponding reference position derivation process is a luma pixel, match each syntax value of pic_width_in_luma_samples and pic_height_in_luma_samples included in the picture information of the SPS in the target layer. If the target is a chroma, a value converted from the syntax value is used depending on the type of color format. For example, if the color format is 4:2:2, a half value of each syntax value is used. refPicW and refPicH denote the width and the height of the reference picture and, if the target is a luma pixel, match each syntax value of pic_width_in_lum_samples and pic_height_in_luma_samples included in the picture information of the SPS in the reference layer. SRLLeftOffset, SRLRightOffset, SRLTopOffset, and SRLBottomOffset denote the inter-layer pixel correspondence offset described with reference to FIG. 12.

(S102) A tentative reference position is calculated on the basis of the inter-layer pixel correspondence information and the inter-layer size ratio. A horizontal component xRefTmp and a vertical component yRefTmp of the tentative reference position corresponding to the target layer pixel are calculated by the following equations. xRefTmp represents a position from a reference point of the upper left pixel of the reference layer picture in the horizontal direction in units of pixels of the reference layer picture, and yRefTmp represents a position from a reference point of the same upper left pixel in the vertical direction in units of pixels of the reference layer picture.

$$xRefTmp = (xP - SRLLeftOffset)scaleX$$

$$yRefTmp = (yP - SRLTopOffset)scaleY$$

xP and yP respectively represent a horizontal component and a vertical component of the target layer pixel from a reference point of the upper left pixel of the target layer picture in units of pixels of the target layer picture. Floor(X) with respect to a real number X means the maximum integer not exceeding X.

In the above equations, the tentative reference position is set to a value resulting from scaling the position of the target pixel from the upper left pixel of the reference layer corresponding region by the inter-layer size ratio. The above calculation may be performed by an approximating operation using an integer representation. For example, scaleX and scaleY may be calculated as an integer resulting from multiplying the actual magnification value by a predetermined value (for example, 16), and xRefTmp or yRefTmp may be calculated by using the integer value. If the target is a chroma pixel, correction may be performed considering the phase difference between a luma and a chroma.

(S103) The phase offset is calculated on the basis of the inter-layer phase correspondence information included in the parameter set. If the inter-layer phase correspondence information described with reference to FIG. 13 is used, a horizontal component phaseOffsetX and a vertical component phaseOffsetY of the phase offset are calculated by the following equations on the basis of the reference layer phase offsets ref_layer_left_phase_offset[i] and ref_layer_top_phase_offset[i] included in the inter-layer phase correspondence information.

$$phaseOffsetX = ref\_layer\_left\_phase\_offset[rlIdx] \div 8$$

$$phaseOffsetY = ref\_layer\_left\_phase\_offset[rlIdx] \div 8$$

rlIdx denotes an index for selection of the reference layer at the time of the corresponding reference position derivation process. In the above equations, since the phase offsets phaseOffsetX and phaseOffsetY are in units of pixels and the reference layer phase offsets ref_layer_left_phase_offset[rlIdx] and ref_layer_top_phase_offset[rlIdx] are in units of ⅛ pixels, the value of the phase offset is set to a value resulting from dividing the latter by eight. If the phase offset and the reference layer phase offset are represented in different units, appropriate adjustment is to be performed in accordance with the difference in units, and the phase offset is not necessarily required at all times to be set according to the above equations.

(S104) A horizontal component xRef and a vertical component yRef of the corresponding reference position with respect to the target pixel (xP, yP) are calculated on the basis of the tentative reference position of the pixel derived in S102 and the phase offset derived in S103. xRef and yRef respectively represent the positions of the corresponding reference pixel in the horizontal direction and in the vertical direction from a reference point of the upper left pixel of the reference picture in units of pixels.

$$xRef=xRefTmp+phaseOffsetX$$

$$yRef=yRefTmp+phaseOffsetY$$

That is, a value resulting from adding the phase offset to the tentative reference position of the pixel is derived as the corresponding reference position. If the tentative reference position of the pixel, the phase offset, and the corresponding reference position are represented in different units, the corresponding reference position is not necessarily required to be calculated according to the above equations, and appropriate adjustment is to be performed to combine the units.

While the corresponding reference position is calculated in units of pixels in the above equations, the present embodiment is not limited to this. For example, a value (xRef16, yRef16) in units of $\frac{1}{16}$ pixels resulting from the integer representation of the corresponding reference position may be calculated by the following equations.

$$xRef16=Floor((xRefTmp+phaseOffestX)*16)$$

$$yRef16=Floor((yRefTmp+phaseOffsetY)*16)$$

Generally, it is preferable to derive the corresponding reference position in units or in a representation preferred for application of the filtering process. For example, it is preferable to derive the target reference position in an integer representation having an accuracy matching the minimum unit referenced by an interpolation filter.

The corresponding reference position derivation process described thus far can derive the position on the reference layer picture corresponding to the target pixel on the target layer picture as the corresponding reference position.

If the inter-layer phase correspondence information described with reference to FIG. 15 is used, the following procedure S103a is performed instead of the procedure S103 of the corresponding reference position derivation process.

(S103a) The horizontal component phaseOffsetX and the vertical component phaseOffsetY of the phase offset are calculated by the following equations on the basis of the reference layer crop offsets cropped_ref_layer_left_offset[i] and cropped_ref_layer_top_offset[i] included in the inter-layer phase correspondence information.

$$croppedOffsetX=(-cropped\_ref\_layer\_left\_offset[i]<<1)$$

$$croppedOffsetY=(-cropped\_ref\_layer\_top\_offset[i]<<1)$$

$$phaseOffsetX=Frac((xP-croppedOffsetX)scaleX)$$

$$phaseOffsetY=Frac((yP-croppedOffsetY)scaleY)$$

Frac(X) means the fractional part of X and is in the relationship of Frac(X)=X−Floor(X).

Figure 20:
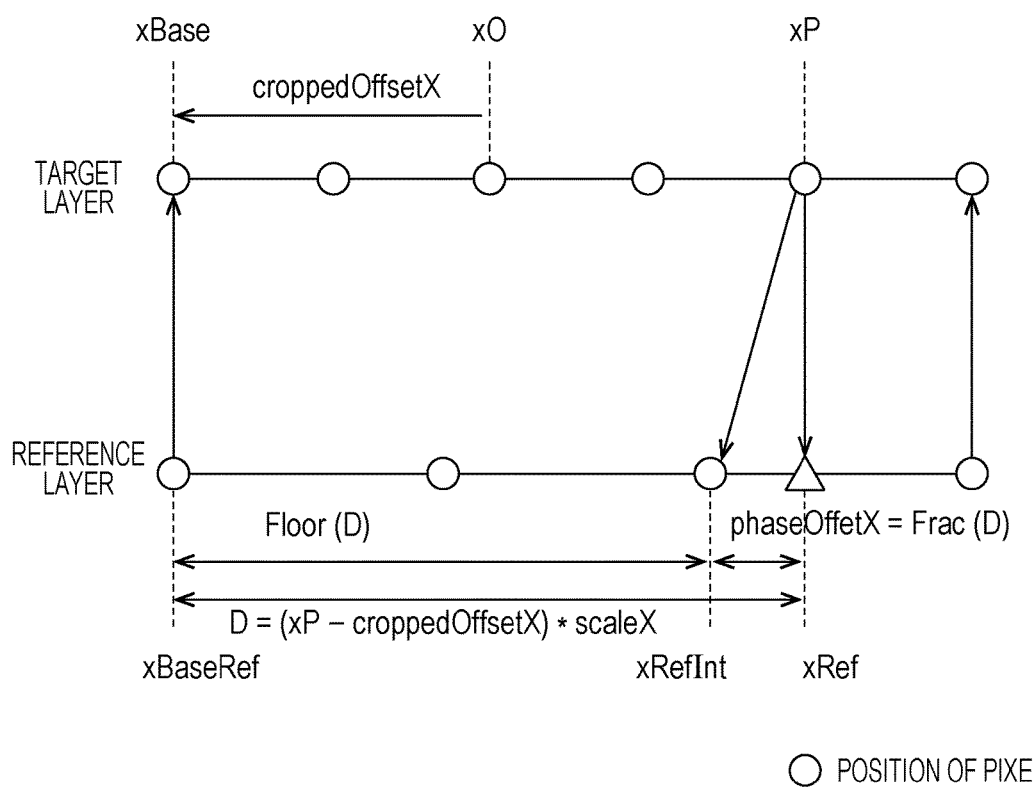
FIG. 20 is a diagram illustrating a relationship between horizontal components of points or amounts used in calculation in a case of calculating a phase offset using a reference layer crop offset.

The meaning of the above calculation equations will be described with reference to FIG. 20. Hereinafter, only the horizontal component will be described, though the same argument is established for the vertical component. FIG. 20 is a diagram illustrating a relationship between horizontal components of points or amounts used in calculation in a case of calculating the phase offset using the reference layer crop offset.

In FIG. 20, the target layer includes the target pixel xP, an upper left pixel x0 of the reference layer corresponding region, and a target layer reference pixel xBase. xBase is positioned on the left side by the reference layer crop offset croppedOffsetX from x0. The reference layer includes a pixel xBaseRef corresponding to xBase, a position xRefInt of a pixel corresponding to xP, and the reference position (corresponding reference position) xRef corresponding to xP. As illustrated in the drawing, a distance D between xRef and xBaseRef is calculated by (xP−croppedOffsetX) *scaleX. That is, the distance D is derived by multiplying (xP−croppedOffsetX) which is the distance between xP and xBase by the reference layer ratio scaleX. Since xBaseRef is assumed to be at a pixel, that is, at an integer position, the distance between xRefInt and xBaseRef is equal to the integer part of the distance D (Floor(D)). Since the phase offset phaseOffsetX, that is, the distance between xRef and xRefInt, is smaller than one pixel, the value of phaseOffsetX is equal to the fractional part of the distance D (Frac(D)).

The phase offset is calculated for each target pixel if the phase offset is derived by the process of S103a using the reference layer crop offset included in the inter-layer phase correspondence information. Thus, the advantage over a case of applying the process of S103 that derives the phase offset on the basis of the value of the reference layer phase offset independently of the position of the target pixel is that, although the amount of processing of the corresponding reference position derivation process is increased, the phase offset can be derived more accurately in a particular case where the phase offset is represented by an approximate value in an integer representation.

In the interpolation filtering process, the pixel value at a position corresponding to the corresponding reference position derived by the corresponding reference position derivation process is generated by applying an interpolation filter to the decoded pixel of a pixel near the corresponding reference position on the reference layer picture.

(Effect of Moving Image Decoder 1)

The hierarchical moving image decoder 1 (hierarchical moving image decoder) according to the present embodiment described thus far is an image decoder decoding higher layer encoded data included in hierarchically encoded data and restoring a decoded picture in a higher layer which is the target layer, the decoder including the parameter set decoding unit 12 decoding a parameter set and the predicted image generator 1442 generating a predicted image using inter-layer prediction by referencing a decoded pixel of a reference layer picture. The parameter set decoding unit 12 decodes inter-layer phase correspondence information which is information related to a target layer pixel and to a position on a reference layer picture corresponding to the target layer pixel.

Therefore, since the hierarchical moving image decoder 1 can derive an accurate position on the reference layer picture corresponding to the predicted target pixel using the inter-layer phase correspondence information, the accuracy of the predicted pixel generated by the interpolation process is improved. Thus, the higher layer decoded picture can be output by decoding encoded data of which the amount of encoding is smaller than that in the related art.

(Configuration of Hierarchical Moving Image Encoder)

Figure 21:
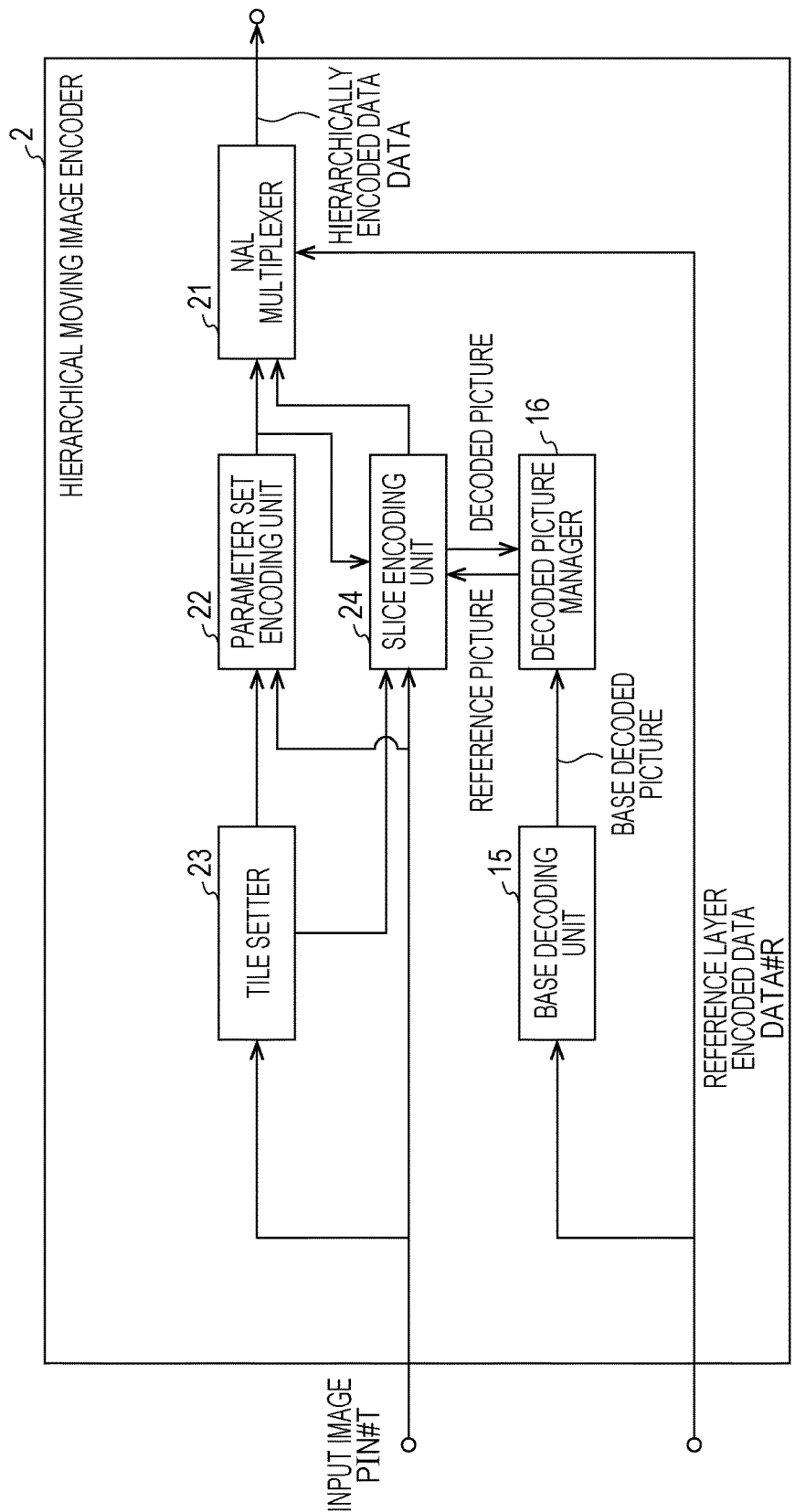
FIG. 21 is a functional block diagram illustrating a schematic configuration of a hierarchical moving image encoder according to one embodiment of the present invention.

A schematic configuration of the hierarchical moving image encoder 2 will be described by using FIG. 21. FIG. 21 is a functional block diagram illustrating a schematic configuration of the hierarchical moving image encoder 2. The hierarchical moving image encoder 2 encodes a target layer input image PIN#T while referencing the reference layer encoded data DATA#R to generate the target layer hierarchically encoded data DATA. The reference layer encoded data DATA#R is assumed to be previously encoded in the hierarchical moving image encoder corresponding to the reference layer.

As illustrated in FIG. 21, the hierarchical moving image encoder 2 includes an NAL multiplexer 21, a parameter set encoding unit 22, a tile setter 23, a slice encoding unit 14, the decoded picture manager 16, and the base decoding unit 15.

The NAL multiplexer 21 generates the hierarchical moving image encoded data DATA that is multiplexed in the NAL by storing the input target layer encoded data DATA#T and the reference layer encoded data DATA#R in the NAL unit and outputs the hierarchical moving image encoded data DATA to an external unit.

The parameter set encoding unit 22 sets a parameter set (VPS, SPS, and PPS) used in encoding of the input image on the basis of the input tile information and the input image and supplies the parameter set as a part of the target layer encoded data DATA#T to the NAL multiplexer 21 by packetizing the parameter set in the VCL NAL format.

The parameter set encoded by the parameter set encoding unit 22 includes at least the picture information, the display region information, and the inter-layer pixel correspondence information described in correlation with the hierarchical moving image decoder 1.

The tile setter 23 sets the tile information about a picture on the basis of the input image and supplies the tile information to the parameter set encoding unit 22 and to the slice encoding unit 24. The tile information is set as indicating splitting of the size of the picture into, for example, M×N tiles. M and N are arbitrary positive integers. The tile information may be set to split the picture into, for example, tiles of a predetermined size (for example, 128 pixel×128 pixel tiles).

The slice encoding unit 24 encodes a part of the input image corresponding to the slice constituting the picture on the basis of the input image, the parameter set, the tile information, and the reference picture recorded in the decoded picture manager 16, which are input, to generate the part of the encoded data and supplies the part of the encoded data to the NAL multiplexer 21 as a part of the target layer encoded data DATA#T. The slice encoding unit 24 will be described in detail later.

The decoded picture manager 16 is the same constituent as the decoded picture manager 16 included in the hierarchical moving image decoder 1 described previously. However, since the decoded picture manager 16 included in the hierarchical moving image encoder 2 is not required to output a picture recorded in the internal DPB as an output picture, the output can be omitted. The description of the decoded picture manager 16 of the hierarchical moving image decoder 1 can be applied to the decoded picture manager 16 of the hierarchical moving image encoder 2 by replacing the word "decoded" with "encoded" in the description.

The base decoding unit 15 is the same constituent as the base decoding unit 15 included in the hierarchical moving image decoder 1 described previously and thus will not be described in detail.

(Slice Encoding Unit)

Figure 22:
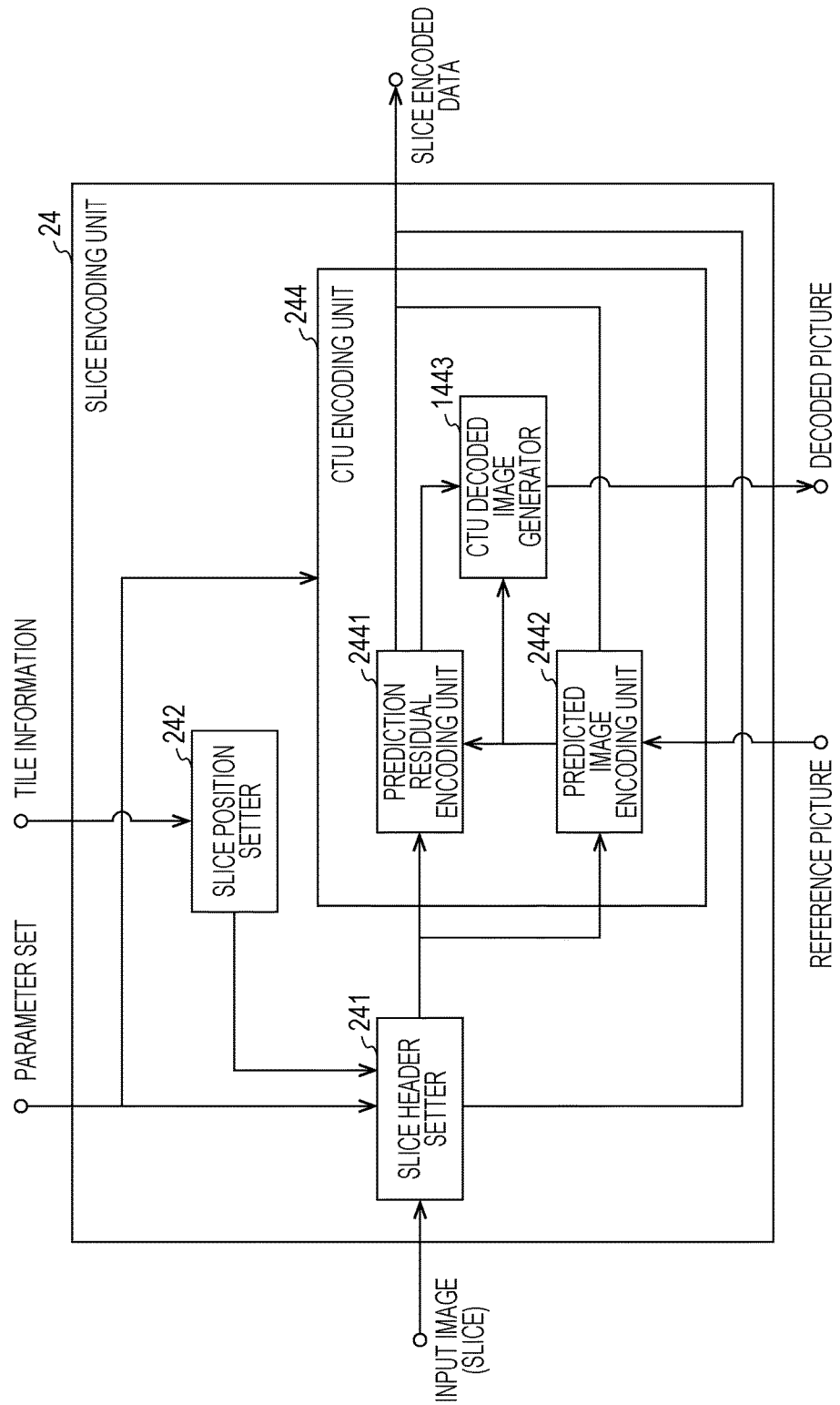
FIG. 22 is a functional block diagram illustrating a configuration of a slice encoding unit included in the hierarchical moving image encoder.

Next, a configuration of the slice encoding unit 24 will be described in detail with reference to FIG. 22. FIG. 22 is a functional block diagram illustrating a schematic configuration of the slice encoding unit 24.

As illustrated in FIG. 22, the slice encoding unit 24 includes a slice header setter 241, a slice position setter 242, and a CTU encoding unit 244. The CTU encoding unit 244 includes a prediction residual encoding unit 2441, a predicted image encoding unit 2442, and the CTU decoded image generator 1443 inside.

The slice header setter 241 generates the slice header used in encoding of the input image that is input in units of slices, on the basis of the input parameter set and the slice position information. The generated slice header is output as a part of the slice encoded data and is supplied to the CTU encoding unit 244 along with the input image.

The slice header generated by the slice header setter 241 includes at least the SH slice position information described with reference to FIG. 19.

The slice position setter 242 determines the position of a slice within the picture on the basis of the input tile information and supplies the position of the slice to the slice header setter 241.

The CTU encoding unit 244 encodes the input image (part thereof corresponding to the target slice) in units of CTUs on the basis of the input parameter set and the slice header to generate and output the slice data and the decoded image (decoded picture) related to the target slice. Encoding of the CTU is performed by the predicted image encoding unit 2442, the prediction residual encoding unit 2441, and the CTU decoded image generator.

The predicted image encoding unit 2441 determines a prediction method and prediction parameters for the target CTU included in the target slice, generates a predicted image on the basis of the determined prediction method, and outputs the predicted image to the prediction residual encoding unit 2441 and to the CTU decoded image generator 1443. Information about the prediction method and the prediction parameters is encoded in a variable-length manner as the prediction information (PT information) and is output as a part of the slice data included in the slice encoded data. Types of prediction methods that can be selected by the predicted image encoding unit 2441 include at least inter-layer image prediction.

The predicted image encoding unit 2441, if inter-layer image prediction is selected as the prediction method, performs the corresponding reference position derivation process to determine the position of the reference layer pixel corresponding to the predicted target pixel and determines the predicted pixel value using the interpolation process based on the position. As the corresponding reference position derivation process, each process described for the predicted image generator 1442 of the hierarchical moving image decoder 1 can be applied. For example, the process described with reference to FIG. 1 can be applied.

The prediction residual encoding unit 2441 outputs the quantization transform coefficient (TT information) obtained by transforming and quantizing the difference image between the input image and the predicted image, which are input, as a part of the slice data included in the slice encoded data. In addition, inverse transformation and inverse quantization are applied to the quantization transform coefficient to restore the prediction residual, and the restored prediction residual is output to the CTU decoded image generator 1443.

The CTU decoded image generator 1443 has the same function as the constituent of the same name in the hierarchical moving image decoder 1 and thus will be designated by the same reference sign and will not be described.

(Effect of Moving Image Encoder 2)

The hierarchical moving image encoder 2 according to the present embodiment described thus far is an image encoder generating higher layer encoded data from an input image, the encoder including the parameter set encoding unit 22 decoding a parameter set and the predicted image encoding unit 2442 generating a predicted image using inter-layer prediction by referencing a decoded pixel of a reference layer picture. The parameter set encoding unit 22 encodes inter-layer phase correspondence information that is information related to a target layer pixel and a position on the reference layer picture corresponding to the target layer pixel, and the predicted image encoding unit 2442 performs the corresponding reference position derivation process which derives a position on the reference layer corresponding to the predicted target pixel, on the basis of the inter-layer phase correspondence information at the time of performing inter-layer prediction.

Therefore, since the hierarchical moving image encoder 2 can derive an accurate position on the reference layer picture corresponding to the predicted target pixel using the inter-layer phase correspondence information, the accuracy of the predicted pixel generated by the interpolation process is improved. Thus, encoded data can be generated and output with a smaller amount of encoding than the related art.

[Hierarchically Encoded Data Converter 3]

Figure 23:
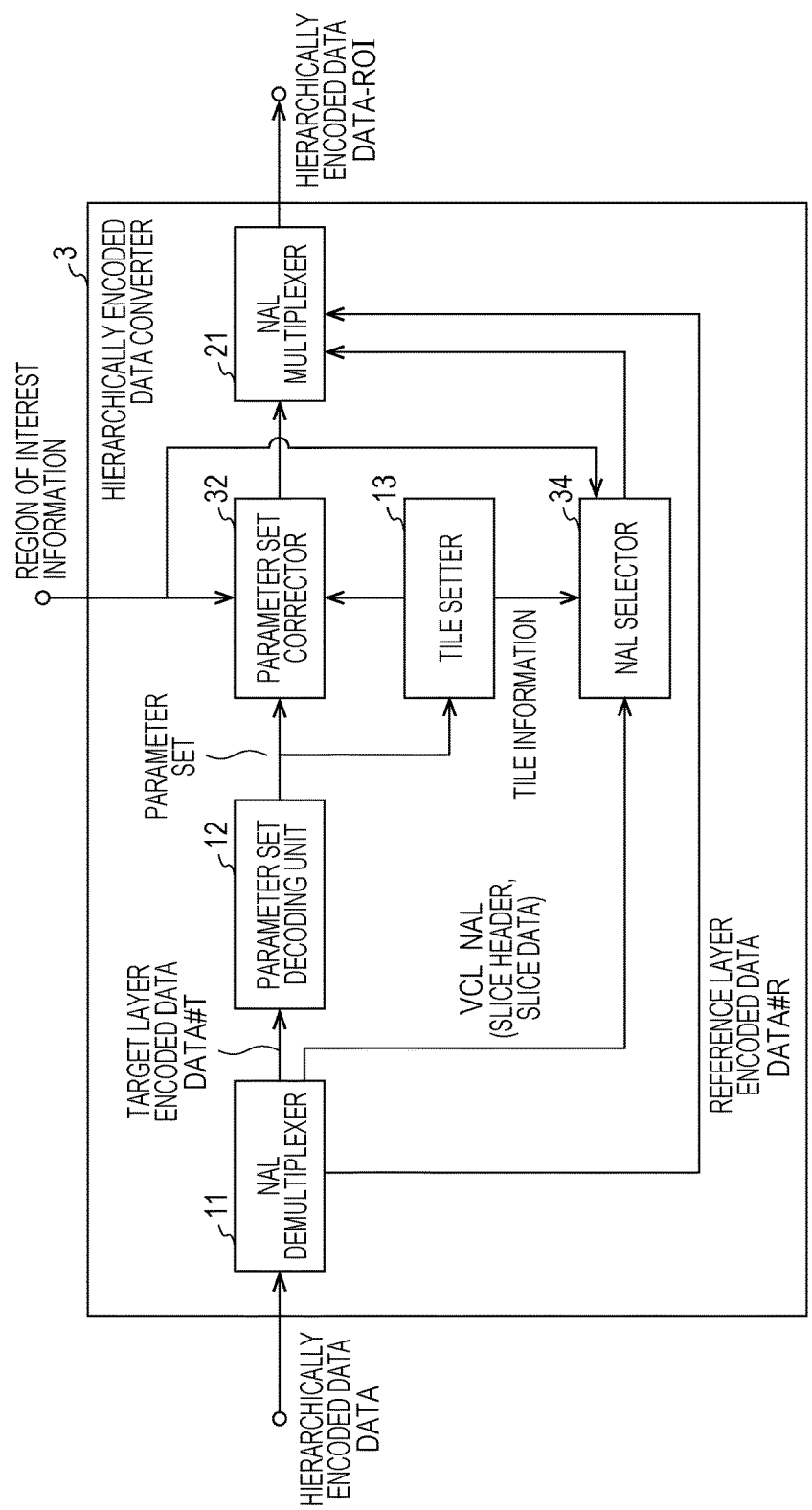
FIG. 23 is a functional block diagram illustrating a schematic configuration of a hierarchically encoded data converter according to one embodiment of the present invention.

A schematic configuration of the hierarchically encoded data converter 3 will be described by using FIG. 23. FIG. 23 is a functional block diagram illustrating a schematic configuration of the hierarchically encoded data converter 3. The hierarchically encoded data converter 3 converts the input hierarchically encoded data DATA to generate hierarchically encoded data DATA-ROI related to input region of interest information. The hierarchically encoded data DATA is hierarchically encoded data generated by the hierarchical moving image encoder 2. A higher layer moving image related to the region of interest information can be reproduced by inputting the hierarchically encoded data DATA-ROI into the hierarchical moving image decoder 1.

As illustrated in FIG. 23, the hierarchically encoded data converter 3 includes the NAL demultiplexer 11, the NAL multiplexer 21, the parameter set decoding unit 12, the tile setter 13, a parameter set corrector 32, and an NAL selector 34.

The NAL demultiplexer 11, the parameter set decoding unit 12, and the tile setter 13 respectively have the same function as the constituents of the same name included in the hierarchical moving image decoder 1 and thus will be designated by the same reference sign and will not be described.

The NAL multiplexer 21 has the same function as the constituent of the same name included in the hierarchical moving image encoder 2 and thus will be designated by the same reference sign and will not be described.

The parameter set corrector 32 corrects the input parameter set information on the basis of the input region of interest information and the tile information and outputs the parameter set information. The parameter set corrector 34 corrects, schematically, the picture information, the display region information, the inter-layer pixel correspondence information, the inter-layer phase correspondence information, and the PPS tile information included in the parameter set.

The region of interest information corresponds to a partial region of a picture specified by a user (for example, a viewer of a reproduced moving image) in the picture constituting a moving image. The region of interest information is specified by, for example, a rectangular region. In this case, the region of interest information can be specified as, for example, the positional offsets of the top edge, the bottom edge, the left edge, and the right edge of the rectangle representing the region of interest from the corresponding edge (top edge, bottom edge, left edge, or right edge) of the entire picture. While a region of a shape other than a rectangle (for example, a circular region, a polygonal region, or a region indicating an object extracted by object extraction) may be used as the region of interest, hereinafter, the region of interest will be assumed to be rectangular for simplification of description. If the content described below is applied to the region other than a rectangle, the content can be applied by regarding, for example, a rectangle having a minimum area and including the region of interest as the region of interest in the description below.

(Summary of Conversion Process)

First, a summary of parameter set correction using a conversion process performed by the hierarchically encoded data converter 3 will be described with reference to FIG. 24. FIG. 24 is a diagram illustrating a relationship among a picture, a region of interest, and tiles in hierarchically encoded data before and after conversion. FIG. 24(a) illustrates a relationship among a picture, a region of interest, and tiles in hierarchically encoded data before conversion. In a parameter set of the hierarchically encoded data before conversion, the picture (before conversion) is configured of three tiles in the vertical direction and three tiles in the horizontal direction, total nine tiles (tiles T00, T01, T02, T10, T11, T12, T20, T21, and T22 in the raster scan order from upper left). The region of interest is set to an upper right part of the picture and has a region overlapping with the tiles T01, T02, T11, and T12. FIG. 24(b) illustrates a relationship among the picture, the region of interest, and the tiles in the hierarchically encoded data after conversion. In a parameter set of the hierarchically encoded data after conversion, the picture (after conversion) is configured of two tiles in the vertical direction and two tiles in the horizontal direction, total four tiles (tiles T01, T02, T11, and T12). That is, a tile that is in the picture before conversion and does not have an overlapping region with the region of interest (tiles T00, T10, T20, T21, and T22) is not included in the picture after conversion.

Schematically, the hierarchically encoded data converter 3 removes a tile not having an overlapping region with the region of interest from the input hierarchically encoded data before conversion and corrects the relevant parameter set to generate the hierarchically encoded data after conversion. The hierarchical moving image decoder can generate a decoded image related to the region of interest with input of the hierarchically encoded data after conversion.

(Correction of Tile Information)

The parameter set corrector 32 references the input region of interest information and the tile information and updates the PPS tile information so that a part of the corresponding region includes only a tile (extraction target tile) overlapping with the region of interest. The PPS tile information is updated on the basis of information about the extraction target tile. First, if the number of extraction target tiles is one, tiles enabled flag is corrected to zero. If the number of extraction target tiles is two or more, the correction process can be omitted. Next, (nu_tile_columns_minus1) which represents the number of tile rows and (num_tile_rows_minus1) which represents the number of tile columns are corrected on the basis of the number of extraction target tiles of the picture included in the horizontal direction and in the vertical direction. Next, if the size of the tile is not uniform (uniform$_{13}$ spacing$_{13}$ flag is equal to zero), a bit string corresponding to the syntax related to the width of the tile column not including the extraction target tile and to the height of the tile row not including the extraction target tile is removed from the parameter set.

(Correction of Picture Information)

The parameter set corrector 32 corrects the picture information using the size of the region corresponding to a set of extraction target tiles as the size of the picture after conversion. In the example illustrated in FIG. 24, the sum of the tile columns respectively including the tiles T01 and T02 is set as the width of the target layer picture pic_width_in_luma_samples after correction. The sum of the heights of the tile rows respectively including the tiles T01 and T11 is set as the height of the target layer picture pic_height_in_luma_samples.

(Correction of Inter-Layer Pixel Correspondence Information)

The parameter set corrector 32 corrects the inter-layer pixel correspondence information included in the parameter set on the basis of a change in the size of the picture. Specifically, all of the inter-layer pixel correspondence offsets included in the inter-layer pixel correspondence information are corrected. For the scaled reference layer left offset (scaled_ref_layer_left_offset[i]) constituting the inter-layer pixel correspondence offsets, the sum of the widths of the tile columns positioned at the left of the region of interest and not including the extraction target tile is added thereto. For example, in the example of FIG. 24, the width of the tile column including the tile T00 is added. Similarly, for the scaled reference layer top offset (scaled_ref_layer_top_offset[i]), the sum of the heights of the tile rows positioned above the region of interest and not including the extraction target tile is added thereto. Similarly, for the scaled reference layer right offset (scaled_ref_layer_right_offset[i]), the sum of the widths of the tile columns positioned at the right of the region of interest and not including the extraction target tile is added thereto. Similarly, for the scaled reference layer bottom offset (scaled_ref_layer_bottom_offset[i]), the sum of the heights of the tile rows positioned below the region of interest and not including the extraction target tile is added thereto.

(Correction of Inter-Layer Phase Correspondence Information)

The parameter set corrector 32 corrects the inter-layer phase correspondence information included in the parameter set on the basis of a change in the size of the picture. Correction of the inter-layer phase correspondence information is such that, schematically, the phase of the upper left pixel of the picture after conversion matches the phase of the same pixel before conversion. In other words, correction is performed in such a manner that the phase derived by the corresponding reference position derivation process at the upper left pixel of an extraction target region before conversion (upper left pixel of the most upper left tile positioned among the extraction target tiles) matches the phase derived by the target reference position derivation process at the upper left pixel of the picture after conversion. The correction is not necessarily required to be performed for complete matching. The effect of the present invention is obtained provided that the phases become similar by performing the correction compared with a case where the correction is not performed.

If the reference layer phase offset is used as the inter-layer phase correspondence information, a specific correction process is as follows. First, a corresponding reference position (xL0Ref, yL0Ref) with respect to an upper left pixel (xL0, yL0) of the extraction target region in the higher layer picture is calculated. In derivation of the target reference position, the corresponding reference position derivation process described with the predicted image generator 1442 of the hierarchical moving image decoder may be applied by referencing, for example, the parameter set before correction. Next, a tentative corresponding reference position (xLARefTmp, yLARefTmp) with respect to an upper left pixel (xLA, yLA) of the higher layer picture after conversion is derived by referencing the parameter set after correction in which the reference layer phase offset is set to zero. Given that the reference layer left phase offset and the reference layer top phase offset after correction are phaseLAft and phaseTAft, the reference layer offset after correction can be determined by the following equations.

phaseLAft=Frac(Frac(xL0Ref)−Frac(xLARefTmp))

phaseTAft=Frac(Frac(yL0Ref)−Frac(yLARefTmp))

These equations are derived from the fact that the fractional part of the sum of the reference layer phase offset after correction and the corresponding reference position in a case where the reference layer phase offset of the upper left pixel of the picture after conversion is equal to zero matches the fractional part of the corresponding reference position of the upper left pixel of the extraction corresponding region before conversion.

(Correction of Display Region Information)

The parameter set corrector 32 rewrites the display region information of the SPS included in the input parameter set so that the display region information matches the region of interest indicated by the input region of interest information. If the syntax described with reference to FIG. 9 is used as the display region information of the SPS, the display region information is rewritten in the following procedures from S301 to S303.

(S301) A determination of whether the region of interest matches the entire picture is performed. The process proceeds to S302 if the two match or proceeds to S303 if the two do not match.

(S302) If the value of the display region flag before overwriting is one, the value of the display region flag is overwritten as zero, the display region offset (conf_win_left_offset, conf_win_right_offset, conf_win_top_offset, and conf_win_bottom_offset) is removed from the SPS, and the process ends.

(S303) The value of the display region flag is overwritten as one. Each offset of the display region offset is set to the value of the positional offset between each edge of the rectangle representing the region of interest and the corresponding edge of the picture. For example, the value of the display region top offset (conf_win_top_offset) is set to the positional offset of the top edge of the region of interest from the top edge of the picture. If the value of the display region flag before rewriting is one, the original value of the region of interest offset is overwritten by using the value of the region of interest offset set above. If the value of the display region flag before rewriting is one, the region of interest offset set above is inserted immediately after the display region flag of the SPS.

The NAL selector 34 selects an input video coding layer NAL (VCL NAL) on the basis of the input region of interest information and the tile information. The selected VCL NAL is output to the NAL multiplexer 21 in order and the unselected VCL NAL is destroyed.

The VCL NAL selected by the NAL selector 34 is a VCL NAL including the slice header and the slice data related to the slice included in the extraction target tile. The extraction target tile is determined on the basis of the region of interest information and the tile information as described with reference to FIG. 24. The NAL selector 34 determines whether a slice is included in the extraction target tile from the slice address and the tile information included in the slice header and selects the VCL NAL including the slice if the slice is included in the extraction target tile or destroys the VCL NAL if the slice is not included in the extraction target tile.

(Flow of Hierarchically Encoded Data Conversion Process)

A hierarchically encoded data conversion process performed by the hierarchically encoded data converter 3 is realized by performing the procedures illustrated in S501 to S506 in order.

(S501) The NAL demultiplexer 11 demultiplexes the input hierarchically encoded data DATA. Of the target layer encoded data DATA#T obtained, a part related to the parameter set (non-VCL NAL) is output to the parameter decoding unit 12, and the video coding layer NAL (VCL NAL) corresponding to a part related to the slice layer (slice header and slice data) is output to the NAL selector 34. The reference layer encoded data DATA#R obtained is output to the NAL demultiplexer 21.

(S502) The parameter set decoding unit 12 decodes a parameter set (VPS, SPS, and PPS) from the input non-VCL NAL and outputs the parameter set to the parameter set corrector 32 and to the tile setter 13.

(S503) The tile setter 13 derives the tile information from the input parameter set and outputs the tile information to the parameter set corrector 32 and to the NAL selector 34.

(S504) The parameter set corrector 32 corrects the input parameter set on the basis of the input region of interest information and the tile information and outputs the parameter set.

(S505) The NAL selector 34 selects a part of the input VCL NALs on the basis of the input tile information and the region of interest information and outputs the selected VCL NAL to the NAL multiplexer 21.

(S506) The NAL multiplexer 21 multiplexes the input reference layer encoded data DATA#R using the input parameter set after correction and the slice header and the slice data after correction as the target layer encoded data after correction and outputs the reference layer encoded data DATA#R as the hierarchically encoded data DATA-ROI to an external unit.

(Effect of Hierarchically Encoded Data Converter 3)

The hierarchically encoded data converter 3 according to the present embodiment described thus far includes the NAL selector 34 correcting a part of video layer encoded data (VCL NAL) included in target layer (higher layer) encoded data on the basis of the region of interest information. In addition, the hierarchically encoded data converter 3 includes the parameter set corrector 32. The NAL selector 34 selects a tile having a region overlapping with a region of interest as the extraction target tile on the basis of the region of interest indicated by the region of interest information, and the video layer encoded data related to a slice included in the selected extraction target tile is included in the hierarchically encoded data after conversion. The parameter set corrector 32 corrects the picture information, the PPS tile information, the display information, the inter-layer pixel correspondence information, and the inter-layer phase correspondence information on the basis of the region of interest information and the tile information.

According to the hierarchically encoded data converter 3, the hierarchically encoded data after conversion can be configured by converting the input hierarchically encoded data and extracting the VCL NAL related to the extraction target tile (tile having a region overlapping with the region of interest) in the higher layer. Since the VCL NAL related to a tile not having an overlapping region with the region of interest is destroyed, the amount of encoding in the hierarchically encoded data after conversion is small compared with the hierarchically encoded data before conversion. According to the hierarchically encoded data converter 3, the picture information, the PPS tile information, and the display information are corrected by changing the parameter set in accordance with the extraction target tile. Thus, the hierarchically encoded data after conversion can be decoded by the hierarchical moving image decoder, and a decoded picture related to the region of interest can be displayed. In addition, since the inter-layer pixel correspondence information and the inter-layer phase correspondence information are corrected, a correspondence between a higher layer pixel and a reference layer pixel is maintained in the encoded data before and after conversion. Thus, a predicted image of inter-layer prediction generated by using the encoded data before conversion and a predicted image of inter-layer prediction generated by using the encoded data after conversion are maintained to be approximately the same.

[Region of Interest Display System]

A system displaying the region of interest information (region of interest display system SYS) can be configured by combining the hierarchical moving image decoder 1, the hierarchical moving image encoder 2, and the hierarchically encoded data converter 3 described above.

Figure 25:
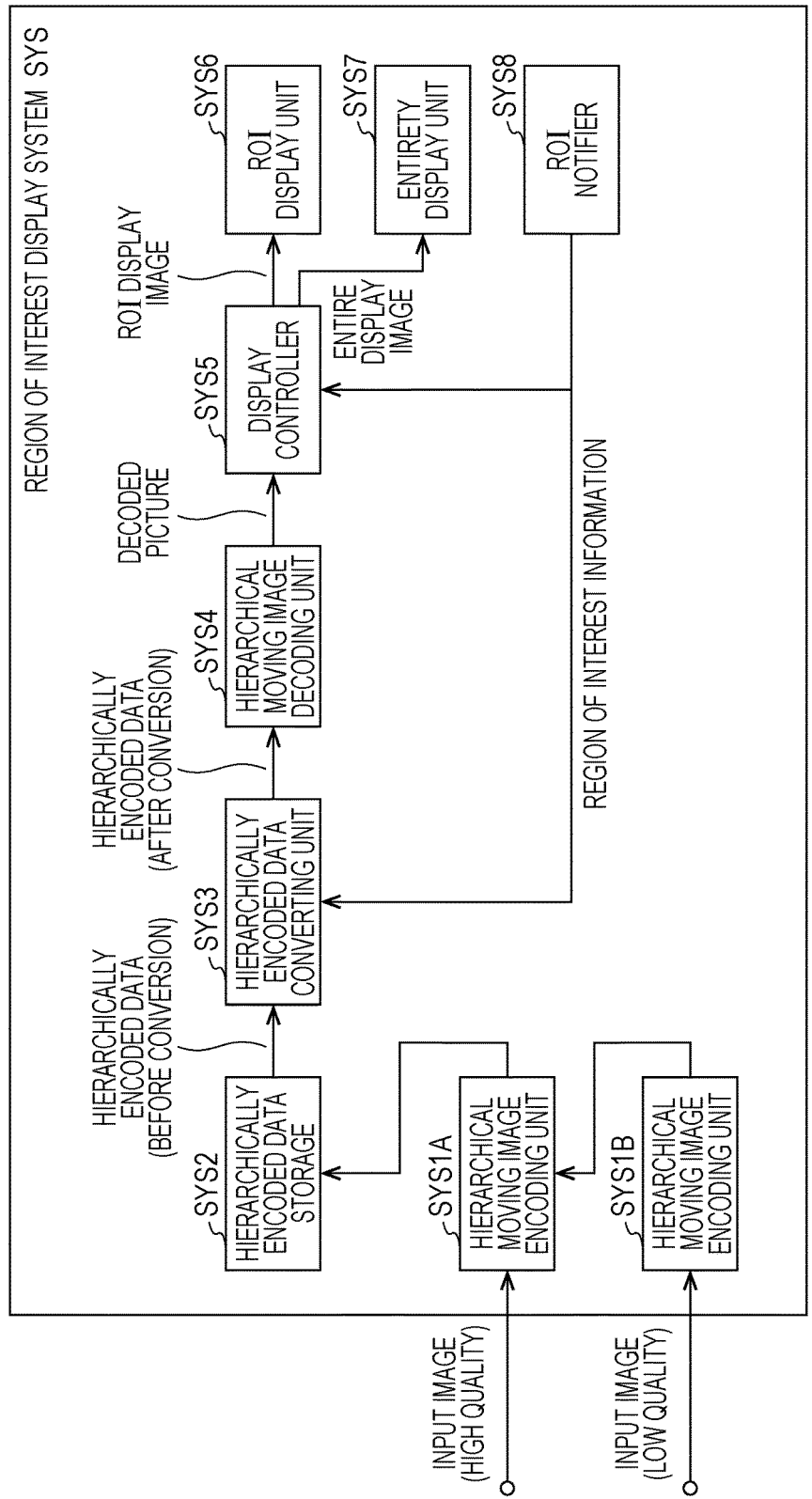
FIG. 25 is a block diagram illustrating a configuration of a region of interest display system realized by a combination of the hierarchical moving image decoder, the hierarchical moving image encoder, and the hierarchically encoded data converter.

The region of interest display system that can be configured by combining the hierarchical moving image decoder 1, the hierarchical moving encoder 2, and the hierarchically encoded data converter 3 described above will be described on the basis of FIG. 25. FIG. 25 is a block diagram illustrating a configuration of the region of interest display system formed by combining the hierarchical moving image decoder 1, the hierarchical moving image encoder 2, and the hierarchically encoded data converter 3. The region of interest display system SYS, schematically, hierarchically encodes and stores input images of different quality, converts and provides the stored hierarchically encoded data according to the region of interest information from a user, and displays a high-quality reproduced image related to the region of interest (ROI) by decoding the converted hierarchically encoded data.

As illustrated in FIG. 25, the region of interest display system SYS includes a hierarchical moving image encoding unit SYS1A, a hierarchical moving image encoding unit SYS1B, a hierarchically encoded data storage SYS2, a hierarchically encoded data converting unit SYS3, a hierarchical moving image decoding unit SYS4, a display controller SYS5, an ROI display unit SYS6, an entirety display unit SYS7, and an ROI notifier SYS8 as constituents.

The hierarchical moving image encoder 2 described above can be used as the hierarchical moving image encoding units SYS1A and SYS1B.

The hierarchically encoded data storage SYS2 stores hierarchically encoded data and supplies the hierarchically encoded data upon request. A computer including a recording medium (memory, hard disk, or optical disk) can be used as the hierarchically encoded data storage SYS2.

The hierarchically encoded data converting unit 3 can be used as the hierarchically encoded data converting unit SYS3.

The hierarchical moving image decoder 1 can be used as the hierarchical moving image decoding unit SYS4.

The display controller SYS5 provides a decoded picture as an ROI display image to the ROI display unit SYS6 or supplies a decoded picture as an entire display image to the entirety display unit SYS7 on the basis of the region of interest information.

The display controller SYS5, if a region of interest is specified in the region of interest information, supplies a lower layer decoded picture, which is a decoded picture input from the hierarchical moving image decoding unit, as an entire display image to the entirety display unit SYS7 and supplies a higher layer decoded picture, which is a decoded picture input from the hierarchical moving image decoding unit, as an ROI display image to the ROI display unit SYS6. If a region of interest is not specified in the region of interest information, the ROI display image is not supplied to the ROI display unit SYS6.

The display controller SYS5, if a region of interest is specified in the region of interest information, supplies a lower layer decoded picture, which is a decoded picture input from the hierarchical moving image decoding unit, as an entire display image to the entirety display unit SYS7 but does not supply a decoded picture to the ROI display unit SYS6.

The display controller SYS5, if the region of interest information is changed, may supply a partial region of a lower layer decoded picture of hierarchically encoded data, which is a part corresponding to the region of interest, as the ROI display image to the ROI display unit SYS6 while a higher layer decoded picture of the hierarchically encoded data related to the region of interest information is supplied from the hierarchical moving image decoding unit SYS4. Although the partial region of the lower layer decoded picture, which is a part corresponding to the region of interest, has a low definition compared with the higher layer decoded picture related to the region of interest, the advantage of doing this is that the region of interest can be displayed on the ROI display unit SYS6 without waiting for a delay accompanied by notification of the region of interest to the hierarchically encoded data converting unit and the conversion process after a user specifies the region of interest.

The ROI display unit SYS6 displays the ROI display image at a predetermined display position in a predetermined display region. For example, the display region is a screen of a television, and the display position is a partial region of the screen (for example, a rectangular region at the upper right corner). In addition, for example, the display region is a display of a portable terminal (smartphone or tablet computer), and the display position is the entire display.

The entirety display unit SYS7 displays the entire display image at a predetermined display position in a predetermined display region. For example, the display region is a screen of a television, and the display position is the entire screen. If the display regions of the entirety display unit SYS7 and the ROI display unit SYS6 are the same, it is preferable to display the ROI display image to be overlaid on the entire display image. The ROI display unit SYS6 or the entirety display unit SYS7 may display an input image by enlarging or reducing the image to a size matching the size of the display region.

The ROI notifier SYS8 notifies the region of interest information specified by a user using a predetermined method. For example, a user can transmit a region of interest to the ROI notifier by specifying a region corresponding to the region of interest on the display region in which the entire display image is displayed. The ROI notifier SYS8 notifies information indicating absence of a region of interest as the region of interest information if a user does not specify a region of interest.

(Flow of Region of Interest Display System)

Processing performed by the region of interest display system can be divided into a hierarchically encoded data generation and storing process and a region of interest data generation and reproduction process.

In the hierarchically encoded data generation and storing process, hierarchically encoded data is generated from input images of different quality and is stored. The hierarchically encoded data generation and storing process is performed in the procedures from T101 to T103.

(T101) The hierarchical moving image encoding unit SYS1B encodes an input low-quality input image and supplies the generated hierarchically encoded data to the hierarchical moving image encoding unit SYS1A. That is, the hierarchical moving image encoding unit SYS1B generates and outputs hierarchically encoded data used as the reference layer (lower layer) in the hierarchical moving image encoding unit SYS1A from an input image.

(T102) The hierarchical moving image encoding unit SYS1A encodes an input high-quality input image and the input hierarchically encoded data as the reference layer encoded data, generates hierarchically encoded data, and outputs the hierarchically encoded data to the hierarchically encoded data storage SYS2.

(T103) The hierarchically encoded data storage SYS2 assigns an appropriate index to the input hierarchically encoded data and records the hierarchically encoded data on an internal recording medium.

In the region of interest data generation and reproduction process, hierarchically encoded data is read from the hierarchically encoded data storage SYS2 and is converted into hierarchically encoded data corresponding to the region of interest, and the converted hierarchically encoded data is decoded to be reproduced and displayed. The region of interest data generation and reproduction process is performed in the following procedures of T201 to T207.

(T201) Hierarchically encoded data related to a moving image selected by a user is supplied from the hierarchically encoded data storage SYS2 to the hierarchically encoded data converting unit SYS3.

(T202) The ROI notifier SYS8 notifies the region of interest information specified by a user to the hierarchically encoded data converting unit SYS3 and to the display controller SYS5.

(T203) The hierarchically encoded data converting unit SYS3 converts the input hierarchically encoded data on the basis of the input region of interest information and outputs the hierarchically encoded data to the hierarchical moving image decoding unit SYS4.

(T204) The hierarchical moving image decoding unit SYS4 decodes the input hierarchical moving image encoded data (after conversion) and outputs reproduced higher layer and lower layer decoded pictures to the display controller SYS5.

(T205) The display controller SYS5 outputs the input decoded pictures to the ROI display unit SYS6 and to the entirety display unit SYS7 on the basis of the input region of interest information.

(T206) The entirety display unit SYS7 displays the entire input display image.

(T207) The ROI display unit SYS6 displays the input ROI display image.

(Effect of Region of Interest Display System SYS)

The region of interest display system SYS according to the present embodiment described thus far includes a region of interest notifier (ROI notifier SYS8) supplying region of interest information, the hierarchically encoded data converting unit SYS3 converting hierarchically encoded data on the basis of the region of interest information to generate hierarchically encoded data after conversion, the hierarchical moving image decoding unit SYS4 decoding the hierarchically encoded data after conversion to output higher layer and lower layer decoded pictures, the display controller SYS5, a region of interest display unit (ROI display unit SYS6), and the entirety display unit SYS7. The display controller SYS5 supplies the lower layer decoded picture to the entirety display unit SYS7 and supplies the higher layer decoded picture to the region of interest display unit.

According to the region of interest display system SYS, the entire lower layer decoded picture can be displayed, and a decoded picture of a region specified by the region of interest information can be displayed. The decoded picture of a region specified by the region of interest information is decoded by using the higher layer encoded data of the hierarchically encoded data and thus has a high definition. In addition, the hierarchically encoded data converted on the basis of the region of interest has a smaller amount of encoding than the hierarchically encoded data before conversion. Therefore, using the region of interest display system SYS allows reduction in bandwidth required to transmit hierarchically encoded data transmission and reproduction of a high-definition decoded picture related to the region of interest.

(Application Example for Other Hierarchical Moving Image Encoding/Decoding Systems)

The hierarchical moving image encoder 2 and the hierarchical moving image decoder 1 described above can be used as being mounted on various apparatuses performing transmission, reception, recording, and reproduction of a moving image. A moving image may be a natural moving image captured by a camera or the like or may be an artificial moving image (includes CG and GUI) generated by a computer or the like.

Figure 26:
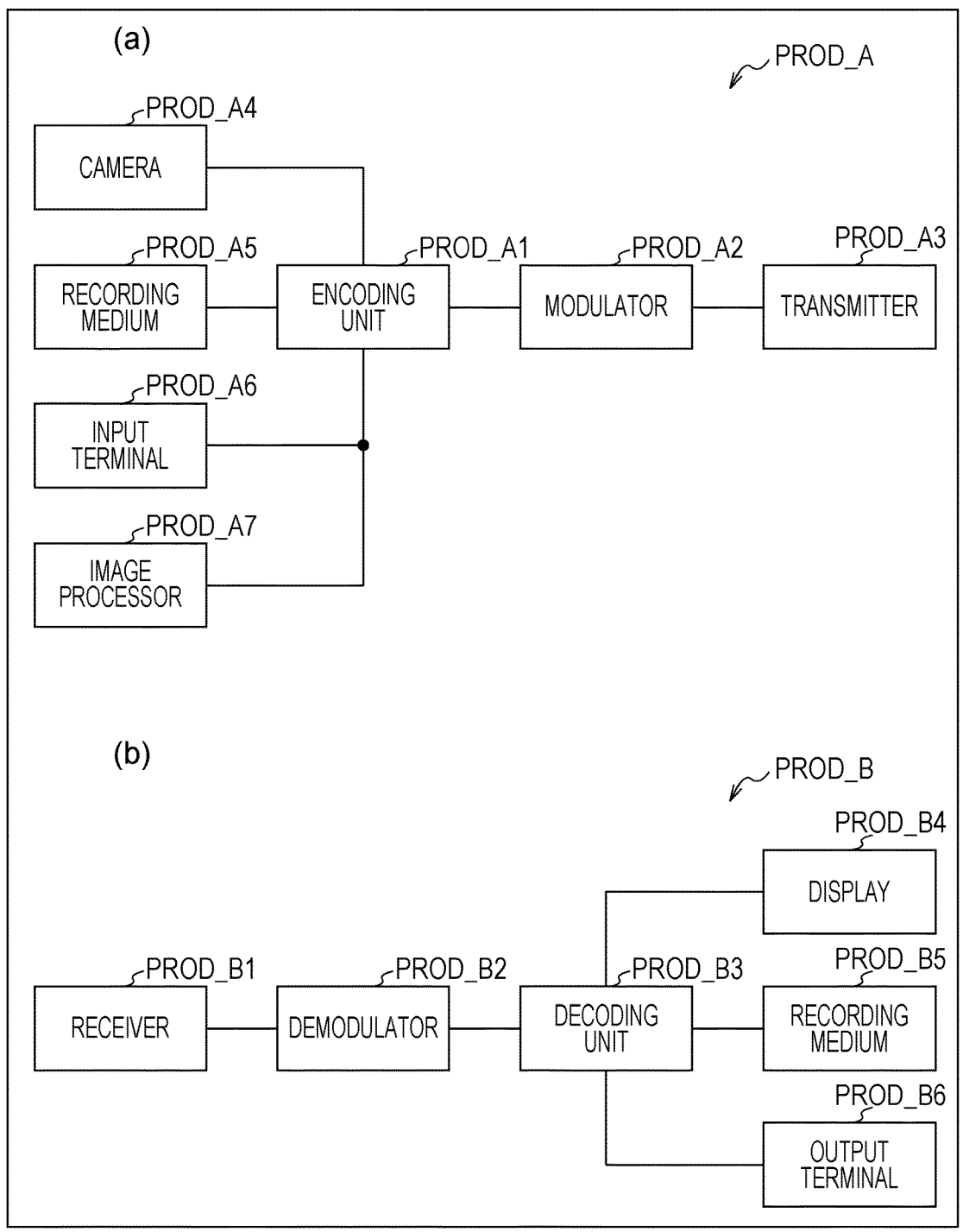
FIG. 26 is a diagram illustrating a configuration of a transmission device on which the hierarchical moving image encoder is mounted and a configuration of a reception device on which the hierarchical moving image decoder is mounted.

Transmission and reception of a moving image that can use the hierarchical moving image encoder 2 and the hierarchical moving image decoder 1 described above will be described on the basis of FIG. 26. FIG. 26(*a*) is a block diagram illustrating a configuration of a transmission apparatus PROD_A on which the hierarchical moving image encoder 2 is mounted.

As illustrated in FIG. 26(*a*), the transmission apparatus PROD_A includes an encoding unit PROD_A1 encoding a moving image to obtain encoded data, a modulator PROD_A2 modulating a carrier wave with the encoded data obtained by the encoding unit PROD_A1 to obtain a modulated signal, and a transmitter PROD_A3 transmitting the modulated signal obtained by the modulator PROD_A2. The hierarchical moving image encoder 2 described above is used as the encoding unit PROD_A1.

The transmission apparatus PROD_A may further include a camera PROD_A4 capturing a moving image, a recording medium PROD_A5 on which a moving image is recorded, an input terminal PROD_A6 for inputting of a moving image from an external unit, and an image processor A7 generating or processing an image, as a supply source of a moving image to be input into the encoding unit PROD_A1. While a configuration in which the transmission apparatus PROD_A includes all of these elements is illustrated in FIG. 26(*a*), a part of the elements may be omitted.

The recording medium PROD_A5 may be a type on which a non-encoded moving image is recorded or may be a type on which a moving image encoded by using an encoding scheme for recording different from an encoding scheme for transmission is recorded. In the latter case, a decoding unit (not illustrated) that decodes encoded data read from the recording medium PROD_A5 in accordance with the encoding scheme for recording may be interposed between the recording medium PROD_A5 and the encoding unit PROD_A1.

FIG. 26(*b*) is a block diagram illustrating a configuration of a reception apparatus PROD_B on which the hierarchical moving image decoder 1 is mounted. As illustrated in FIG. 26(*b*), the reception apparatus PROD_B includes a receiver PROD_B1 receiving a modulated signal, a demodulator PROD_B2 demodulating the modulated signal received by the receiver PROD_B1 to obtain encoded data, and a decoding unit PROD_B3 decoding the encoded data obtained by the demodulator PROD_B2 to obtain a moving image. The hierarchical moving image decoder 1 described above is used as the decoding unit PROD_B3.

The reception apparatus PROD_B may further include a display PROD_B4 displaying a moving image, a recording medium PROD_B5 for recording of a moving image, and an output terminal PROD_B6 for outputting of a moving image to an external unit, as a supply destination of a moving image output by the decoding unit PROD_B3. While a configuration in which the reception apparatus PROD_B includes all of these elements is illustrated in FIG. 26(*b*), a part of the elements may be omitted.

The recording medium PROD_B5 may be a type for recording of a non-encoded moving image or may be a type encoded by an encoding scheme for recording different from an encoding scheme for transmission. In the latter case, an encoding unit (not illustrated) that encodes a moving image obtained from the decoding unit PROD_B3 in accordance with the encoding scheme for recording may be interposed between the decoding unit PROD_B3 and the recording medium PROD_B5.

A transmission medium for transmission of the modulated signal may be wired or wireless. A transmission form in which the modulated signal is transmitted may be broadcasting (indicates a transmission form in which a transmission destination is not specified in advance) or may be communication (indicates a transmission form in which a transmission destination is specified in advance). That is, transmission of the modulated signal may be realized by any of wireless broadcasting, wired broadcasting, wireless communication, and wired communication.

A broadcasting station (broadcasting facility or the like)/reception station (television receiver or the like) for terrestrial digital broadcasting, for example, is an example of the transmission apparatus PROD_A/reception apparatus PROD_B transmitting or receiving the modulated signal using wireless broadcasting. A broadcasting station (broadcasting facility or the like)/reception station (television receiver or the like) for cable television broadcasting is an example of the transmission apparatus PROD_A / reception apparatus PROD_B transmitting or receiving the modulated signal using wired broadcasting.

A server (workstation or the like)/client (television receiver, personal computer, smartphone, or the like) for a video on demand (VOD) service, a moving image sharing service, or the like using the Internet is an example of the transmission apparatus PROD_A/reception apparatus PROD_B transmitting or receiving the modulated signal using communication (generally, any of a wireless type and a wired type is used as a transmission medium in a LAN, and a wired type is used as a transmission medium in a WAN). Types of personal computers include a desktop PC, a laptop PC, and a tablet PC. Types of smartphones include a multifunctional mobile phone terminal.

The client of a moving image sharing service has a function of encoding a moving image captured by a camera and uploading the moving image to the server in addition to a function of decoding encoded data downloaded from the server and displaying the decoded data on a display. That is, the client of a moving image sharing service functions as both of the transmission apparatus PROD_A and the reception apparatus PROD_B.

Figure 27:
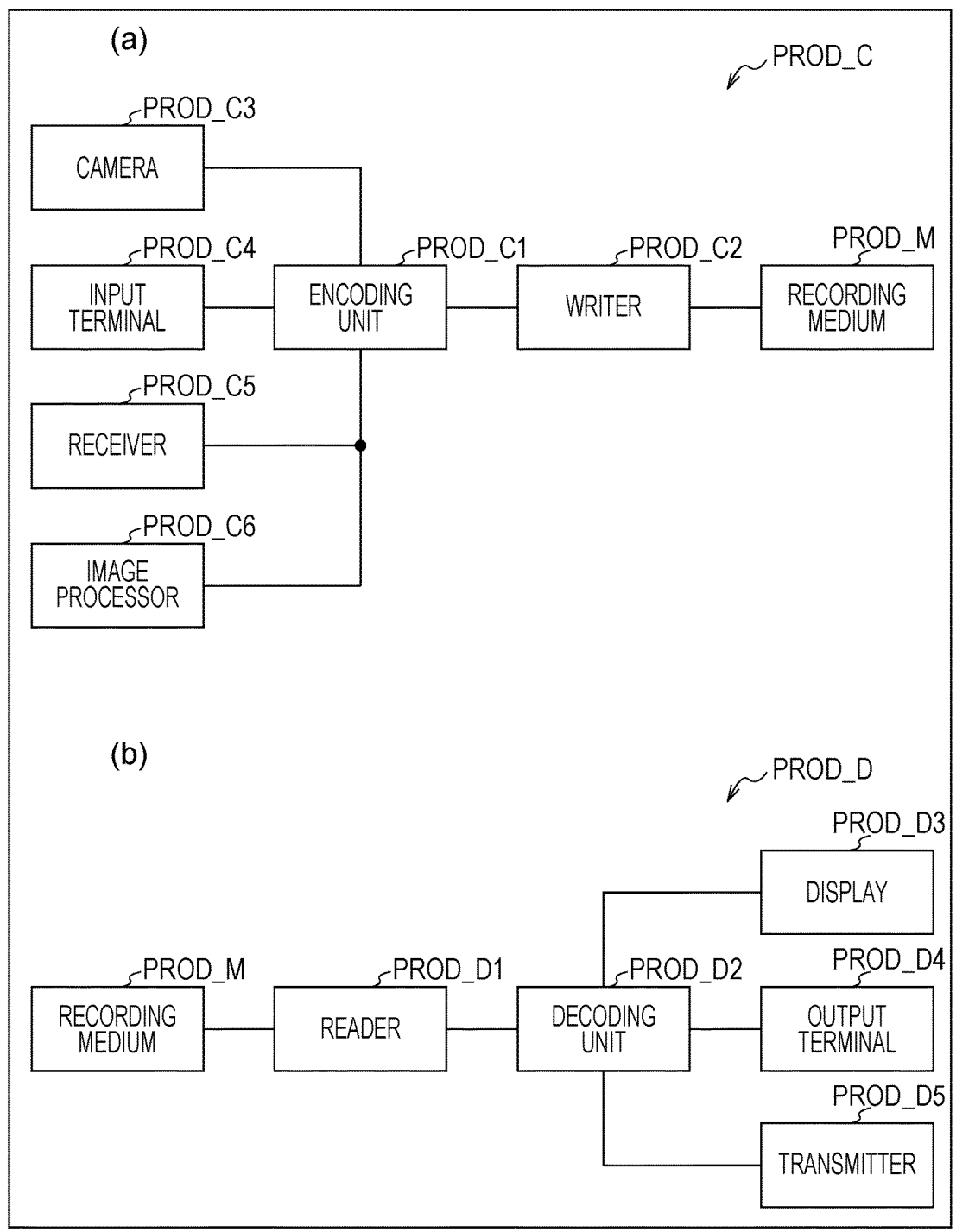
FIG. 27 is a diagram illustrating a configuration of a recording device on which the hierarchical moving image encoder is mounted and a configuration of a reproduction device on which the hierarchical moving image decoder is mounted.

Recording and reproduction of a moving image that can use the hierarchical moving image encoder 2 and the hierarchical moving image decoder 1 described above will be described on the basis of FIG. 27. FIG. 27(a) is a block diagram illustrating a configuration of a recording apparatus PROD_C on which the hierarchical moving image encoder 2 described above is mounted.

As illustrated in FIG. 27(a), the recording apparatus PROD_C includes an encoding unit PROD_C1 encoding a moving image to obtain encoded data and a writer PROD_C2 writing the encoded data obtained by the encoding unit PROD_C1 into a recording medium PROD_M. The hierarchical moving image encoder 2 described above is used as the encoding unit PROD_C1.

The recording medium PROD_M may be (1) a type incorporated into the recording apparatus PROD_C, such as a hard disk drive (HDD) or a solid state drive (SSD), (2) a type connected to the recording apparatus PROD_C, such as an SD memory card or a Universal Serial Bus (USB) flash memory, or (3) a type mounted in a drive device (not illustrated) incorporated into the recording apparatus PROD_C, such as a digital versatile disc (DVD) or a Blu-ray Disc (BD; registered trademark).

The recording apparatus PROD_C may further include a camera PROD_C3 capturing a moving image, an input terminal PROD_C4 for inputting of a moving image from an external unit, a receiver PROD_C5 for reception of a moving image, and an image processor C6 generating or processing an image, as a supply source of a moving image to be input into the encoding unit PROD_C1. While a configuration in which the recording apparatus PROD_C includes all of these elements is illustrated in FIG. 27(a), a part of the elements may be omitted.

The receiver PROD_C5 may be a type receiving a non-encoded moving image or may be a type receiving encoded data encoded by using an encoding scheme for transmission different from an encoding scheme for recording. In the latter case, a decoding unit for transmission (not illustrated) that decodes encoded data encoded by using the encoding scheme for transmission may be interposed between the receiver PROD_C5 and the encoding unit PROD_C1.

Such a recording apparatus PROD_C is exemplified by, for example, a DVD recorder, a BD recorder, or a hard disk drive (HDD) recorder (in this case, either the input terminal PROD_C4 or the receiver PROD_C5 serves as a main supply source of a moving image). A camcorder (in this case, the camera PROD_C3 is a main supply source of a moving image), a personal computer (in this case, either the receiver PROD_C5 or the image processor C6 serves as a main supply source of a moving image), a smartphone (in this case, either the camera PROD_C3 or the receiver PROD_C5 serves as a main supply source of a moving image), and the like are also examples of such a recording apparatus PROD_C.

FIG. 27(b) is a block illustrating a configuration of a reproduction apparatus PROD_D on which the hierarchical moving image decoder 1 described above is mounted. As illustrated in FIG. 27(b), the reproduction apparatus PROD_D includes a reader PROD_D1 reading encoded data written in the recording medium PROD_M and a decoding unit PROD_D2 decoding the encoded data read by the reader PROD_D1 to obtain a moving image. The hierarchical moving image decoder 1 described above is used as the decoding unit PROD_D2.

The recording medium PROD_M may be (1) a type incorporated into the reproduction apparatus PROD_D, such as an HDD or an SSD, (2) a type connected to the reproduction apparatus PROD_D, such as an SD memory card or a USB flash memory, or (3) a type mounted in a drive device (not illustrated) incorporated into the reproduction apparatus PROD_D, such as a DVD or a BD.

The reproduction apparatus PROD_D may further include a display PROD_D3 displaying a moving image, an output terminal PROD_D4 for outputting of a moving image to an external unit, and a transmitter PROD_D5 transmitting a moving image, as a supply destination of a moving image output by the decoding unit PROD_D2. While a configuration in which the reproduction apparatus PROD_D includes all of these elements is illustrated in FIG. 27(b), a part of the elements may be omitted.

The transmitter PROD_D5 may be a type transmitting a non-encoded moving image or may be a type transmitting encoded data encoded by using an encoding scheme for transmission different from an encoding scheme for recording. In the latter case, an encoding unit (not illustrated) that encodes a moving image using the encoding scheme for transmission may be interposed between the decoding unit PROD_D2 and the transmitter PROD_D5.

Such a reproduction apparatus PROD_D is exemplified by, for example, a DVD player, a BD player, or an HDD player (in this case, the output terminal PROD_D4 to which a television receiver or the like is connected serves as a main supply destination of a moving image). A television receiver (in this case, the display PROD_D3 serves as a main supply destination of a moving image), digital signage (refers to an electronic signboard or an electronic bulletin board; either the display PROD_D3 or the transmitter PROD_D5 serves as a main supply destination of a moving image), a desktop PC (in this case, either the output terminal PROD_D4 or the transmitter PROD_D5 serves as a main supply destination of a moving image), a laptop or tablet PC (in this case, either the display PROD_D3 or the transmitter PROD_D5 serves as a main supply destination of a moving image), a smartphone (in this case, either the display PROD_D3 or the transmitter PROD_D5 serves as a main supply destination of a moving image), and the like are also examples of such a reproduction apparatus PROD_D.

(Hardware Realization and Software Realization)

Finally, each block of the hierarchical moving image decoder 1 and the hierarchical moving image encoder 2 may be realized in a hardware manner by a logic circuit formed on an integrated circuit (IC chip) or may be realized in a software manner by using a central processing unit (CPU).

In the latter case, each device includes a CPU executing instructions of a control program realizing each function, a read-only memory (ROM) storing the program, a random access memory (RAM) in which the program is loaded, a storage (recording medium) such as a memory storing the program and a variety of data, and the like. The objects of the present invention can also be achieved in such a manner that a recording medium in which program codes (executable format program, intermediate code program, or source program) of a control program which is software realizing the functions described above for each device are recorded in a manner readable by a computer is supplied to each device and that the computer (or a CPU or a microprocessing unit (MPU)) reads and executes the program codes recorded in the recording medium.

As the recording medium, tapes such as a magnetic tape and a cassette tape, disks including magnetic disks such as a Floppy (registered trademark) disk / hard disk and optical disks such as a compact disc read-only memory (CD-ROM)/ magneto-optical (MO) disk/mini disc (MD)/digital versatile disk (DVD)/CD recordable (CD-R), cards such as an IC card (includes a memory card)/optical card, semiconductor memories such as a mask ROM/erasable programmable read-only memory (EPROM)/electrically erasable and programmable read-only memory (EEPROM; registered trademark)/flash ROM, or logic circuits such as a programmable logic device (PLD) or a field programmable gate array (FPGA) can be used.

Each device may be configured to be connectable to a communication network, and the program codes may be supplied through the communication network. The communication network is not particularly limited provided that the communication network is capable of transmitting the program codes. For example, the Internet, an intranet, an extranet, a local area network (LAN), an integrated services digital network (ISDN), a value-added network (VAN), a community antenna television (CATV) communication network, a virtual private network, a telephone line network, a mobile communication network, or a satellite communication network can be used. A transmission medium constituting the communication network is not limited to a specific configuration or a type provided that the transmission medium is a medium capable of transmitting the program codes. For example, either a wired type such as Institute of Electrical and Electronic Engineers (IEEE) 1394, USB, power-line communication, a cable TV line, a telephone line, and an asymmetric digital subscriber line (ADSL) line or a wireless type such as an infrared ray including infrared data association (IrDA) and remote control, Bluetooth (registered trademark), the IEEE802.11 wireless protocol, high data rate (HDR), near field communication (NFC), Digital Living Network Alliance (DLNA; registered trademark), a mobile phone network, a satellite line, and a terrestrial digital network can be used. The present invention may be realized in a form of a computer data signal embedded in a carrier wave, the signal into which the program codes are implemented by electronic transmission.

The present invention is not limited to each embodiment described above, and various modifications can be carried out within the scope disclosed in the claims. Embodiments obtained by an appropriate combination of each technical means disclosed in different embodiments are to be included in the technical scope of the present invention. Furthermore, new technical features can be formed by combining each technical means disclosed in each embodiment.

[Supplementary Matters]

In order to resolve the problems, an image decoder according to the present invention is an image decoder that decodes higher layer encoded data included in hierarchically encoded data and restores a decoded picture in a higher layer which is a target layer, the decoder being characterized by including a parameter set decoding unit that decodes a parameter set, and a predicted image generator that generates a predicted image using inter-layer prediction by referencing a decoded pixel of a reference layer picture, in which the parameter set decoding unit decodes inter-layer phase correspondence information that is information related to a target layer pixel and a position on the reference layer picture corresponding to the target layer pixel.

In the image decoder, it is preferable that the inter-layer phase correspondence information includes a reference layer phase offset that is an amount representing a difference between an upper left pixel of a reference layer corresponding region and a corresponding reference position corresponding to the upper left pixel of the reference layer corresponding region.

In the image decoder, it is preferable that the inter-layer phase correspondence information includes the number of reference layer phase offsets that is an amount indicating the number of reference layer phase offsets included in the parameter set.

In the image decoder, it is preferable that each reference layer phase offset value is set to zero if the reference layer phase offset is not decoded from the parameter set.

In the image decoder, it is preferable that the inter-layer phase correspondence information includes a reference pixel offset that is an amount representing a position of a reference pixel on the higher layer from the upper left pixel of the reference layer corresponding region.

In the image decoder, it is preferable that the reference pixel indicated by the reference pixel offset is a pixel of which a position in a horizontal direction is the same as or at the left of the upper left pixel of the reference layer corresponding region and of which a position in a vertical direction is the same as or above the upper left pixel of the reference layer corresponding region, and that a reference example layer position corresponding to the reference pixel is an integer position in units of pixels.

In the image decoder, it is preferable that the predicted image generator, at a time of performing inter-layer prediction, performs a corresponding reference position derivation process that derives a reference layer position corresponding to a predicted target pixel, and that the corresponding reference position derivation process derives the reference layer position on the basis of the inter-layer phase correspondence information.

In the image decoder, it is preferable that the corresponding reference position derivation process includes a process of deriving a tentative reference position corresponding to a position of a reference layer pixel corresponding to the predicted target pixel and a process of deriving a phase offset on the basis of the inter-layer phase correspondence information.

In the image decoder, it is preferable that the corresponding reference position derivation process derives the phase offset by adding the phase offset to the tentative reference position after applying conversion that matches the units of both the phase offset and the tentative reference position.

In order to resolve the problems, an image encoder according to the present invention is an image encoder that generates higher layer encoded data from an input image, the encoder being characterized by including a parameter set decoding unit that decodes a parameter set, and a predicted image encoding unit that generates a predicted image using inter-layer prediction by referencing a decoded pixel of a reference layer picture, in which the parameter set decoding unit encodes inter-layer phase correspondence information that is information related to a target layer pixel and a position on the reference layer picture corresponding to the target layer pixel, and the predicted image encoding unit, at a time of performing inter-layer prediction, performs a corresponding reference position derivation process that derives a reference layer position corresponding to a predicted target pixel on the basis of the inter-layer phase correspondence information.

In order to resolve the problems, an encoded data converter according to the present invention is a hierarchically encoded data converter that converts input hierarchically encoded data on the basis of input region of interest information and outputs hierarchically encoded data after conversion, the converter being characterized by including a parameter set decoding unit that decodes a parameter set before correction from the input hierarchically encoded data, a parameter set corrector that corrects the parameter set before correction on the basis of the input region of interest information and generates a parameter set after correction, and an NAL selector that selects a coding layer NAL included in the output hierarchically encoded data on the basis of the tile information and the region of interest information, in which the NAL selector regards a tile having at least a part of a region overlapping with a region of interest indicated by the region of interest information as an extraction target tile and selects a video coding layer NAL corresponding to a slice included in the extraction target tile as a video coding layer NAL to be included in the hierarchically encoded data after conversion, and the parameter set corrector corrects a size of a picture and the tile information included in the parameter set on the basis of the extraction tile.

In the image decoder, it is preferable that the parameter set corrector performs correction to match display region information included in the parameter set and the region of interest information.

In the image decoder, it is preferable that the parameter set further includes inter-layer pixel correspondence information and inter-layer phase correspondence information, and that the parameter set corrector corrects the inter-layer pixel correspondence information and the inter-layer phase correspondence information in such a manner that a position on a reference layer corresponding to a higher layer pixel in the hierarchically encoded data after conversion is close to a reference layer position corresponding to the higher layer pixel in the hierarchically encoded data before conversion.

INDUSTRIAL APPLICABILITY

The present invention can be exemplarily applied to a hierarchical image decoder decoding encoded data in which image data is hierarchically encoded and to a hierarchical image encoder generating encoded data in which image data is hierarchically encoded. In addition, the present invention can be exemplarily applied to a data structure of hierarchically encoded data generated by the hierarchical image encoder and referenced by the hierarchical image decoder.

REFERENCE SIGNS LIST

1 HIERARCHICAL MOVING IMAGE DECODER (IMAGE DECODER)
11 NAL DEMULTIPLEXER
12 PARAMETER SET DECODING UNIT
13 TILE SETTER
14 SLICE DECODING UNIT
141 SLICE HEADER DECODING UNIT
142 SLICE POSITION SETTER
144 CTU DECODING UNIT
1441 PREDICTION RESIDUAL RESTORER
1442 PREDICTED IMAGE GENERATOR
1443 CTU DECODED IMAGE GENERATOR
15 BASE DECODING UNIT
151 VARIABLE-LENGTH DECODING UNIT
152 BASE PARAMETER SET DECODING UNIT
153 BASE PICTURE DECODING UNIT
154 BASE SLICE DECODING UNIT
156 BASE DECODED PICTURE MANAGER
16 DECODED PICTURE MANAGER
2 HIERARCHICAL MOVING IMAGE ENCODER (IMAGE ENCODER)
21 NAL MULTIPLEXER
22 PARAMETER SET ENCODING UNIT
23 TILE SETTER
24 SLICE ENCODING UNIT
241 SLICE HEADER SETTER
242 SLICE POSITION SETTER
244 CTU ENCODING UNIT
2441 PREDICTION RESIDUAL ENCODING UNIT
2442 PREDICTED IMAGE ENCODING UNIT
3 HIERARCHICALLY ENCODED DATA CONVERTER (ENCODED DATA CONVERTER)
32 PARAMETER SET CORRECTOR
34 NAL SELECTOR

The invention claimed is:

1. An image decoder for decoding hierarchically encoded data, the image decoder comprising:
parameter set decoding circuitry that decodes a parameter set including at least an inter-layer pixel correspondence offset of a reference layer corresponding region and a reference layer crop offset; and
reference position derivation circuitry that derives a reference layer phase offset by the reference layer crop offset and an inter-layer size ratio; wherein
the reference position derivation circuitry derives a corresponding reference position of a reference picture using (i) the reference layer phase offset, (ii) the inter-layer pixel correspondence offset, and (iii) the inter-layer size ratio by a following set of equations:

$$xRef = xRefTmp + phaseOffsetX,$$

$$yRef = yRefTmp + phaseOffsetY,$$

xRefTmp and yRefTmp are determined by a following set of equations:

$$xRefTmp = (xP - SRLLeftOffset) * scaleX,$$

$$yRefTmp = (yP - SRLTopOffset) * scaleY;$$

xRef represents a position of a corresponding reference pixel in a horizontal direction from a reference point of an upper left pixel of the reference picture;
yRef represents a position of the corresponding reference pixel in a vertical direction from the reference point of the upper left pixel of the reference picture;
xRefTmp represents a position from a reference point in a horizontal direction from an upper left pixel of a reference layer picture;
yRefTmp represents a position from the reference point in a vertical direction from the upper left pixel of the reference layer picture;
phaseOffsetX represents a horizontal component of the reference layer phase offset;
phaseOffsetY represents a vertical component of the reference layer phase off-set;
xP represents a horizontal component of a target layer pixel from a reference point of a upper left pixel of a target layer picture;

yP represent a vertical component of the target layer pixel from the reference point of the upper left pixel of the target layer picture;

scaleX represents a horizontal component of the inter-layer size ratio calculated by refPicW over SRLW, wherein refPicW denotes a width of the reference layer and SRLW denotes a width of the reference layer corresponding region;

scaleY represents a vertical component of the inter-layer size ratio calculated by refPicH over SRLH, wherein refPicH denotes a height of the reference layer and SRLH denotes a height of the reference layer corresponding region; and SRLLeftOffset and SRLRightOffset represent the inter-layer pixel correspondence offset.

2. A method for decoding hierarchically encoded data, the method comprising:

decoding a parameter set including at least an inter-layer pixel correspondence offset of a reference layer corresponding region and a reference layer crop offset;

deriving a reference layer phase offset by the reference layer crop offset and an inter-layer size ratio; and deriving a corresponding reference position of a reference picture using (i) the reference layer phase offset, (ii) the inter-layer pixel correspondence offset, and (iii) the inter-layer size ratio by a following set of equations:

$$xRef = xRefTmp + phaseOffsetX,$$

$$yRef = yRefTmp + phaseOffsetY,$$

xRefTmp and yRefTmp are determined by a following set of equations:

$$xRefTmp = (xP - SRLLeftOffset) * scaleX,$$

$$RefTmp = (yP - SRLTopOffset) * scaleY;$$

xRef represents a position of a corresponding reference pixel in a horizontal direction from a reference point of an upper left pixel of the reference picture;

yRef represents a position of the corresponding reference pixel in a vertical direction from the reference point of the upper left pixel of the reference picture;

xRefTmp represents a position from a reference point in a horizontal direction from an upper left pixel of a reference layer picture;

yRefTmp represents a position from the reference point in a vertical direction from the upper left pixel of the reference layer picture;

phaseOffsetX represents a horizontal component of the reference layer phase offset;

phaseOffsetY represents a vertical component of the reference layer phase off-set;

xP represents a horizontal component of a target layer pixel from a reference point of a upper left pixel of a target layer picture;

yP represent a vertical component of the target layer pixel from the reference point of the upper left pixel of the target layer picture;

scaleX represents a horizontal component of the inter-layer size ratio calculated by refPicW over SRLW, wherein refPicW denotes a width of the reference layer and SRLW denotes a width of the reference layer corresponding region;

scaleY represents a vertical component of the inter-layer size ratio calculated by refPicH over SRLH, wherein refPicH denotes a height of the reference layer and SRLH denotes a height of the reference layer corresponding region; and SRLLeftOffset and SRLRightOffset represent the inter-layer pixel correspondence offset.

3. An image encoder for encoding hierarchically encoded data, the image encoder comprising:

parameter set encoding circuitry that encodes a parameter set including at least an inter-layer pixel correspondence offset of a reference layer corresponding region and a reference layer crop offset; and reference position derivation circuitry that derives a reference layer phase offset by the reference layer crop offset and an inter-layer size ratio; wherein the reference position derivation circuitry derives a corresponding reference position of a reference picture using (i) the reference layer phase offset, (ii) the inter-layer pixel correspondence offset, and (iii) the inter-layer size ratio by a following set of equations:

$$xRef = xRefTmp + phaseOffsetX,$$

$$yRef = yRefTmp + phaseOffsetY,$$

xRefTmp and yRefTmp are determined by a following set of equations:

$$xRefTmp = (xP - SRLLeftOffset) * scaleX,$$

$$yRefTmp = (yP - SRLTopOffset) * scaleY;$$

xRef represents a position of a corresponding reference pixel in a horizontal direction from a reference point of an upper left pixel of the reference picture;

yRef represents a position of the corresponding reference pixel in a vertical direction from the reference point of the upper left pixel of the reference picture;

xRefTmp represents a position from a reference point in a horizontal direction from an upper left pixel of a reference layer picture;

yRefTmp represents a position from the reference point in a vertical direction from the upper left pixel of the reference layer picture;

phaseOffsetX represents a horizontal component of the reference layer phase offset;

phaseOffsetY represents a vertical component of the reference layer phase off-set;

xP represents a horizontal component of a target layer pixel from a reference point of a upper left pixel of a target layer picture;

yP represent a vertical component of the target layer pixel from the reference point of the upper left pixel of the target layer picture;

scaleX represents a horizontal component of the inter-layer size ratio calculated by refPicW over SRLW, wherein refPicW denotes a width of the reference layer and SRLW denotes a width of the reference layer corresponding region;

scaleY represents a vertical component of the inter-layer size ratio calculated by refPicH over SRLH, wherein refPicH denotes a height of the reference layer and SRLH denotes a height of the reference layer corresponding region; and SRLLeftOffset and SRLRightOffset represent the inter-layer pixel correspondence offset.

* * * * *